US009507155B2

(12) United States Patent
Morimoto

(10) Patent No.: US 9,507,155 B2
(45) Date of Patent: Nov. 29, 2016

(54) HEAD-MOUNTED DISPLAY

(71) Applicant: Sony Corporation, Tokyo (JP)

(72) Inventor: Toshiyasu Morimoto, Kanagawa (JP)

(73) Assignee: Sony Corporation (JP)

( * ) Notice: Subject to any disclaimer, the term of this patent is extended or adjusted under 35 U.S.C. 154(b) by 50 days.

(21) Appl. No.: 13/792,490

(22) Filed: Mar. 11, 2013

(65) Prior Publication Data
US 2013/0249778 A1 Sep. 26, 2013

(30) Foreign Application Priority Data

Mar. 22, 2012 (JP) ................................. 2012-065602

(51) Int. Cl.
*G09G 5/00* (2006.01)
*G02B 27/01* (2006.01)

(52) U.S. Cl.
CPC ......... *G02B 27/0176* (2013.01); *G02B 27/017* (2013.01); *G02B 2027/0132* (2013.01); *G02B 2027/0154* (2013.01); *G02B 2027/0181* (2013.01)

(58) Field of Classification Search
CPC  G02B 27/017; G02B 27/0093; A61B 3/113; H04N 13/044
USPC .......... 345/7–9; 348/115, E13.036, E13.041, 348/E13.023; 359/13, 630, 632, 880
See application file for complete search history.

(56) References Cited

U.S. PATENT DOCUMENTS

| | | | | |
|---|---|---|---|---|
| 4,873,572 A * | 10/1989 | Miyazaki et al. | | 348/45 |
| 5,546,099 A * | 8/1996 | Quint | | G02B 27/0172 128/857 |
| 6,124,977 A * | 9/2000 | Takahashi | | G02B 17/0816 359/636 |
| 6,389,153 B1 * | 5/2002 | Imai et al. | | 382/106 |
| 6,421,031 B1 * | 7/2002 | Ronzani | | G02B 27/017 345/8 |
| 8,786,520 B2 * | 7/2014 | Legerton et al. | | 345/8 |
| 2001/0054989 A1 * | 12/2001 | Zavracky et al. | | 345/8 |
| 2005/0046617 A1 * | 3/2005 | Kurtzer et al. | | 345/8 |
| 2007/0273983 A1 * | 11/2007 | Hebert | | 359/708 |
| 2010/0079356 A1 * | 4/2010 | Hoellwarth | | 345/8 |
| 2011/0012874 A1 * | 1/2011 | Kurozuka | | 345/204 |
| 2012/0013984 A1 * | 1/2012 | Ikeda | | 359/507 |
| 2012/0044369 A1 * | 2/2012 | Irisawa et al. | | 348/208.4 |
| 2013/0182089 A1 * | 7/2013 | Ito | | G02B 27/225 348/56 |

FOREIGN PATENT DOCUMENTS

| | | |
|---|---|---|
| JP | H08152576 A | 6/1996 |
| JP | 2000307973 A | 11/2000 |
| JP | 2001104331 A | 4/2001 |
| JP | 2010050645 A | 3/2010 |
| JP | 2011-145488 A | 7/2011 |

OTHER PUBLICATIONS

Japanese Office Action for JP Application No. 2012065602, dated Nov. 24, 2015.
Japanese Office Action for JP Application No. 2012065602, dated Feb. 9, 2016.
Chinese Office Action for Chinese Application No. 201310084174.6 dated Mar. 2, 2016.
Japanese Office Action for Application No. 2012-065602 dated May 17, 2016.

* cited by examiner

*Primary Examiner* — Andrew Sasinowski
*Assistant Examiner* — Gerald Oliver
(74) *Attorney, Agent, or Firm* — Lerner, David, Littenberg, Krumholz & Mentlik, LLP

(57) ABSTRACT

According to an illustrative embodiment, a head-mounted display is provided. The head-mounted display includes a casing; and a reference portion provided on the casing for observing an eye of a wearer of the head-mounted display such that a relative position between the casing and the eye of the wearer is adjustable.

16 Claims, 14 Drawing Sheets

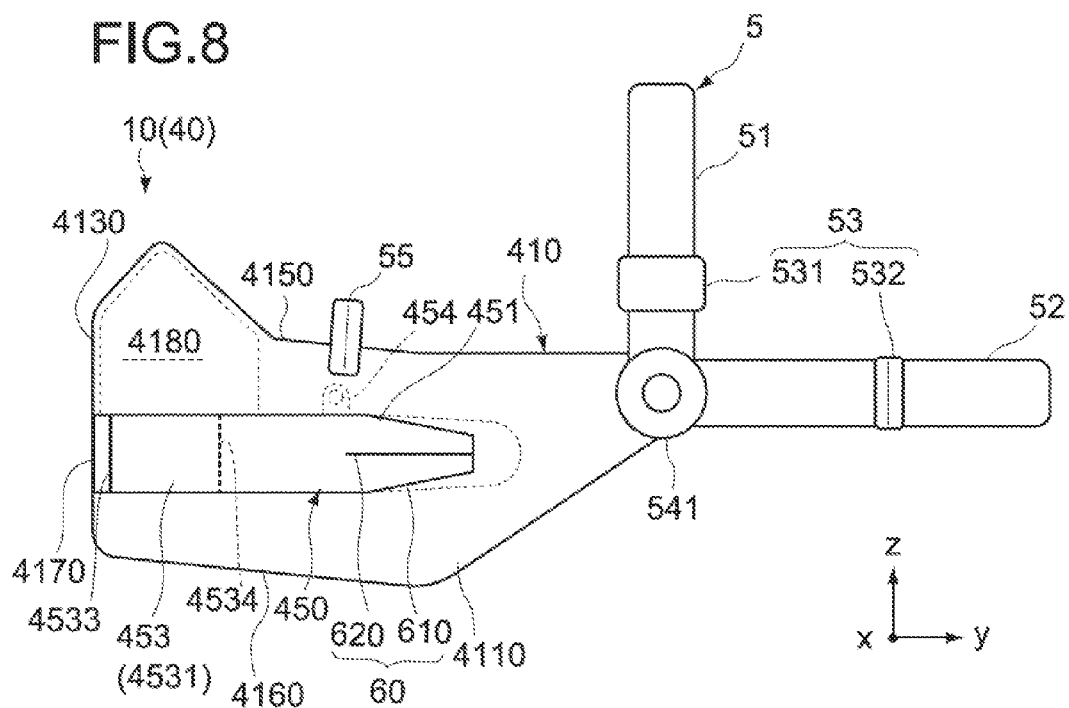
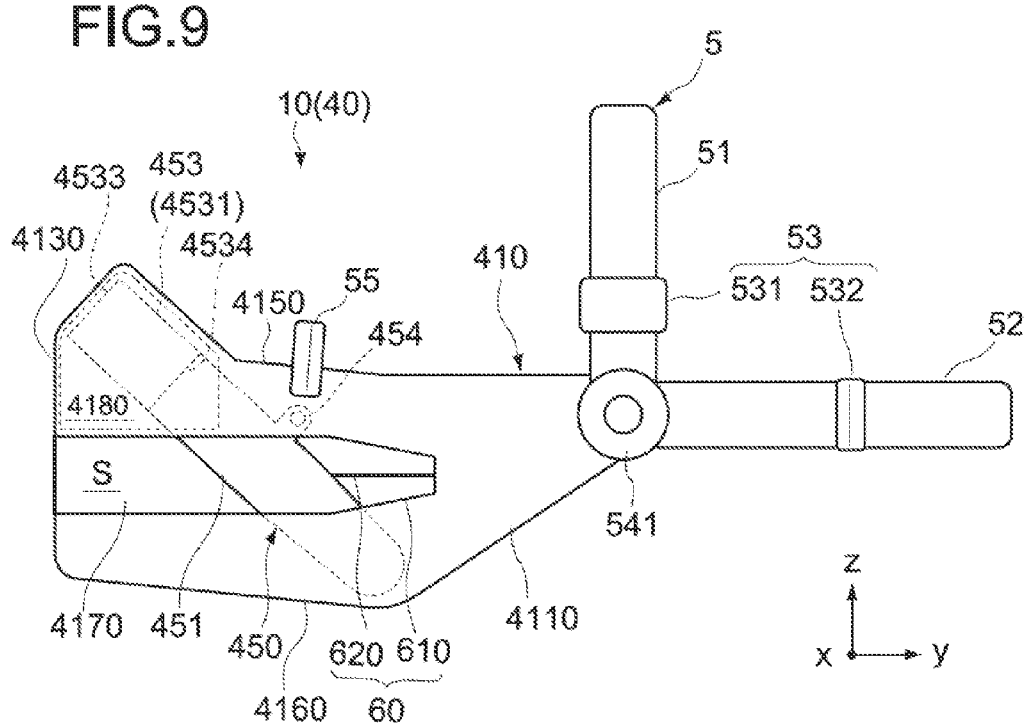

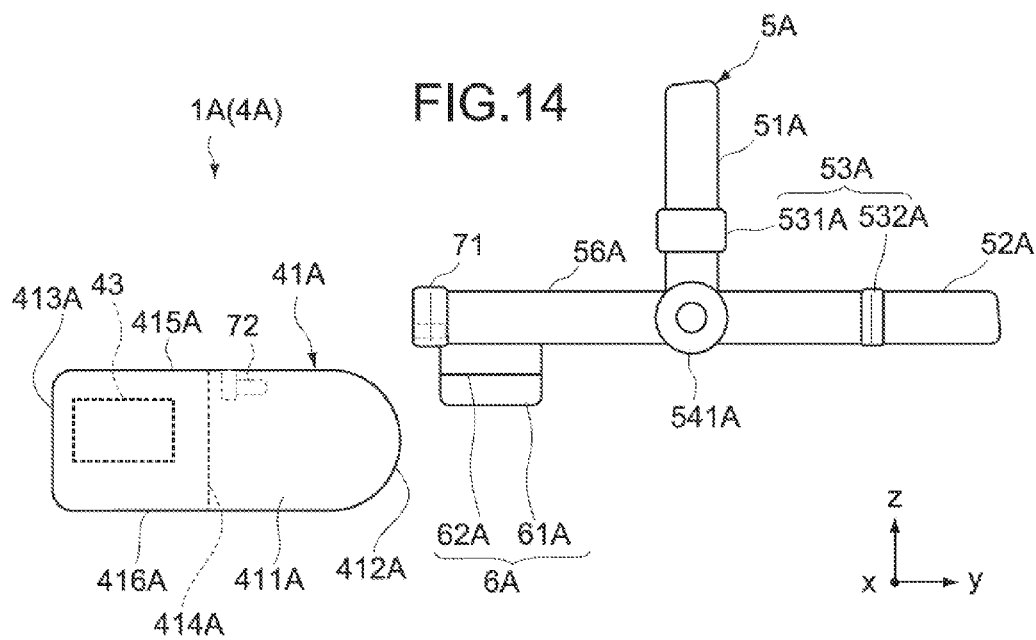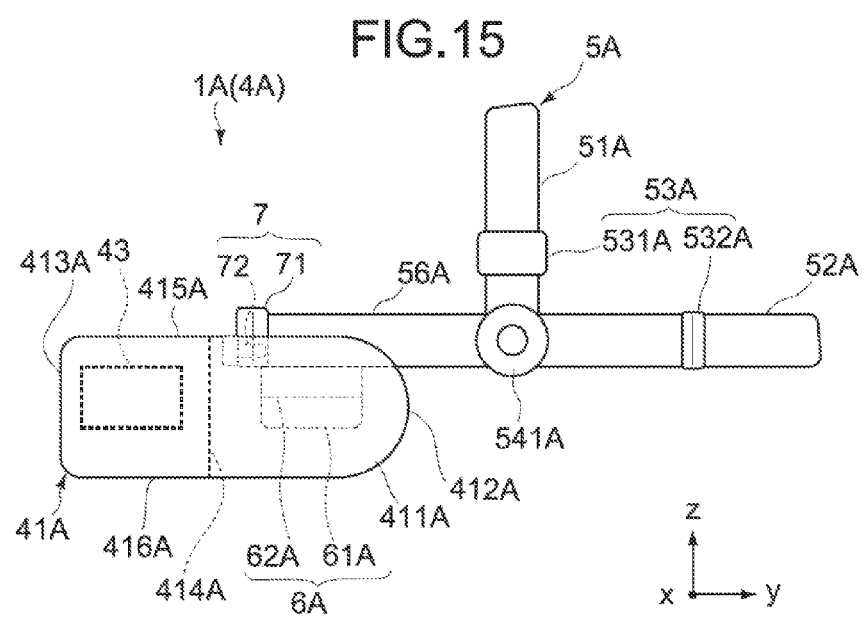

HEAD-MOUNTED DISPLAY

CROSS-REFERENCE TO RELATED APPLICATION

The present application claims priority from Japanese Patent Application No. JP 2012-065602 filed in the Japanese Patent Office on Mar. 22, 2012, the entire content of which is incorporated herein by reference.

BACKGROUND

The present technology relates to a head-mounted display that can be used for medical purposes.

A head-mounted display (HMD) that a wearer puts on the head for, for example, viewing images is known. For example, as one of the HMDs, there is known an HMD including image display surfaces and display elements for right and left eyes (see, Japanese Patent Application Laid-open No. 2011-145488). The HMD having such a configuration can display images having a parallax to the left and right eyes of the wearer through the left and right display surfaces, and hence can present three-dimensional (3D) images without crosstalk.

Meanwhile, also in an endoscope apparatus and the like used for medical purposes, a practical use of a 3D endoscope apparatus that can present 3D images is in consideration. An endoscopic surgery is less invasive for patients than a general surgical operation, and hence is popular in recent years. However, an affected part(s) is checked only by images during a surgery, and hence it is sometimes difficult to perceive a depth with traditional two-dimensional (2D) images. Therefore, it is expected that connecting and using the HMD capable of providing 3D images to a 3D endoscope apparatus can realize a more correct and rapid endoscopic surgery while viewing realistic images of the affected part.

SUMMARY

For wearing the HMD having the above-mentioned configuration, it is typically necessary for the wearer to adjust an HMD mounting position to be such a position that a blurred image and an out-of-focus image are not generated, that is, a position at which the display surfaces and the left and right eyes are opposed to each other while viewing images displayed on the display surfaces.

However, a doctor (wearer) is not allowed to touch the HMD from a hygiene viewpoint upon wearing of the HMD during a surgery, and hence the wearer cannot adjust the mounting position by himself or herself. Therefore, a person other than the wearer needs to help the wearer wear the HMD. However, in this case, it is difficult for such a person to check position relationships between the eyes of the wearer and the display surfaces, which makes adjustment of a relative position of the HMD to the wearer difficult.

In view of the above-mentioned circumstances, there is a need for providing an HMD that allows adjustment of a relative position thereof to a wearer without checking displayed images.

According to an embodiment of the present technology, there is provided a head-mounted display including a main body and a reference portion.

According to an illustrative embodiment, a head-mounted display includes a casing; and a reference portion provided on the casing for observing an eye of a wearer of the head-mounted display such that a relative position between the casing and the eye of the wearer is adjustable.

As described above, according to the embodiments of the present technology, it is possible to provide an HMD that allows adjustment of a relative position thereof to a wearer without checking displayed images.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 8 is a schematic side view showing a head-mounted display according to a second embodiment of the present technology with a movable member being at a first position;

FIG. 9 is a schematic side view showing the head-mounted display according to the second embodiment of the present technology with the movable member being at a second position;

FIG. 14 is a schematic side view showing a head-mounted display according to a third embodiment of the present technology with a casing and a mounting portion being separated from each other;

FIG. 15 is a schematic side view showing the head-mounted display according to the third embodiment of the present technology with the casing and the mounting portion being coupled to each other;

DETAILED DESCRIPTION OF EMBODIMENTS

Hereinafter, embodiments according to the present technology will be described with reference to the drawings.

First Embodiment

Endoscopic System

Figure 1:
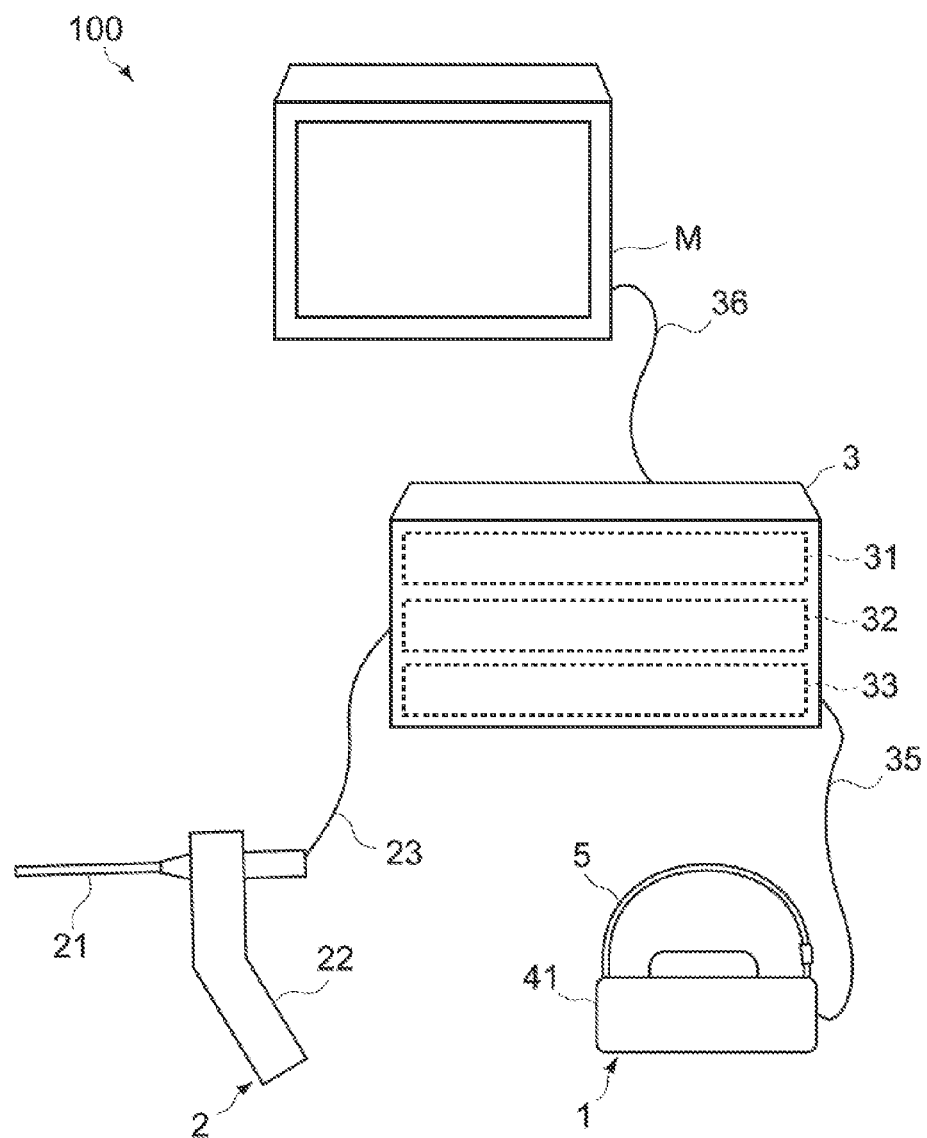
FIG. 1 is a view schematically showing a configuration example of an endoscopic system according to a first embodiment of the present technology.

FIG. 1 is a view schematically showing a configuration example of an endoscopic system according to an embodiment of the present technology. An endoscopic system 100 according to this embodiment includes a head-mounted display (HMD) 1, an endoscope apparatus 2, and a processor unit 3. The endoscopic system 100 according to this embodiment is used in the following manner. Specifically, during an endoscopic surgery, a doctor (wearer) wearing the HMD 1 inserts the endoscope apparatus 2 into the body of a patient and performs treatments such as resection on an affected part(s) while checking through the HMD 1 a state of the affected part that is imaged by the endoscope apparatus 2.

The endoscope apparatus 2 includes, for example, an insertion portion 21 and an operation portion 22. The insertion portion 21 has a tubular shape that can be inserted into a body. The insertion portion 21 includes therein an image sensor such as a CMOS (complementary metal-oxide semiconductor) image sensor and an optical system such as a lens for imaging an affected part(s), which are not shown in the figure. Further, in this embodiment, two image sensors, two optical systems, and the like are provided for capturing right eye and left eye images having a parallax. With this, 3D image data for stereoscopically displaying the affected part can be acquired.

In addition, for example, a knife or forceps for resecting or holding the affected part is/are inserted into the insertion portion 21. The operation portion 22 is configured to perform an operation on the insertion portion 21 and the like while gripped by a surgery assistant or the like. Further, the operation portion 22 is connected to the processor unit 3 via a cable 23.

The processor unit 3 includes, for example, an image processing unit 31, a light source 32, and a converter 33. For example, the image processing unit 31 serves to process images acquired by the endoscope apparatus 2. The light source 32 serves to irradiate the affected part with light upon imaging by the endoscope apparatus 2. The converter 33 serves to perform conversion processing on signals relating to images to be outputted to the HMD 1. The light emitted from the light source 32 is guided to a distal end of the insertion portion 21 via, for example, light guide fibers provided inside the insertion portion 21.

Further, in the image processing unit 31, the right eye and left eye images captured can be overlapped and processed as the 3D image data. The 3D image data is outputted to a monitor apparatus M via, for example, a cable 36, which allows a helper and the like other than the wearer wearing the HMD 1 to also check the affected part during the surgery.

The HMD 1 is electrically connected to the processor unit 3 and worn by the wearer who gives instructions to the surgery assistant or the like who operates the endoscope apparatus 2 while the wearer is observing endoscopic images. The connection method for the HMD 1 and the processor unit 3 is not particularly limited and a wired connection or a wireless connection may be used. In this embodiment, for example, the wired connection is used. Specifically, the HMD 1 and the processor unit 3 are connected to each other via a cable 35 outputted and inputted from/to HDMI (high-definition multimedia interface) terminals.

The signals relating to the right eye and left eye images captured by the endoscope apparatus 2 are processed as image signals by the image processing unit 31. After that, the image signals are each processed by the converter 33 as image data adapted for the HMD 1, and outputted to the HMD 1 via the cable 35. Note that, the processor unit 3 may be configured to supply the HMD 1 with a driving electrical power via the cable 35.

Note that, the converter 33 that processes output signals to the HMD 1 is not limited to the example shown in the figure in which the converter 33 is housed in a single casing together with the image processing unit 31 and the like. The converter 33 may be housed in a separate casing other than that for the image processing unit 31 and the like. Next, a detailed configuration of the HMD 1 according to this embodiment will be described.

[HMD]

Figure 2:
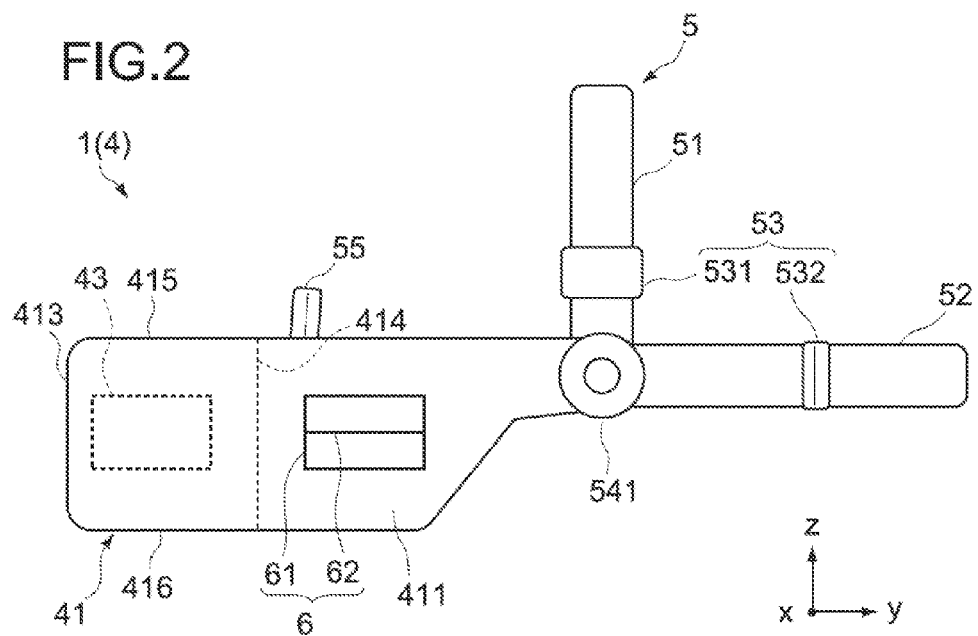
FIG. 2 is a schematic side view showing a head-mounted display according to the first embodiment of the present technology.
Figure 3:
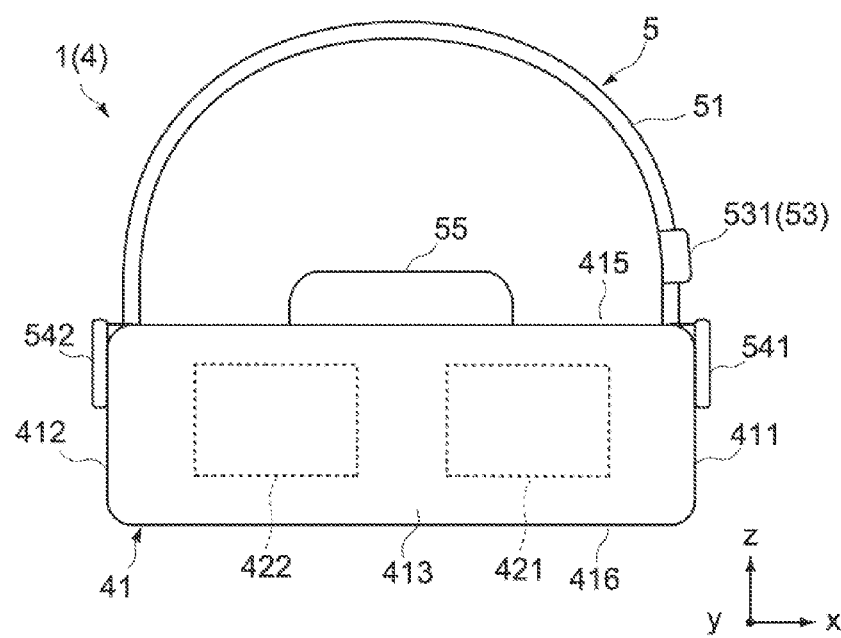
FIG. 3 is a schematic front view showing the head-mounted display according to the first embodiment of the present technology.
Figure 4:
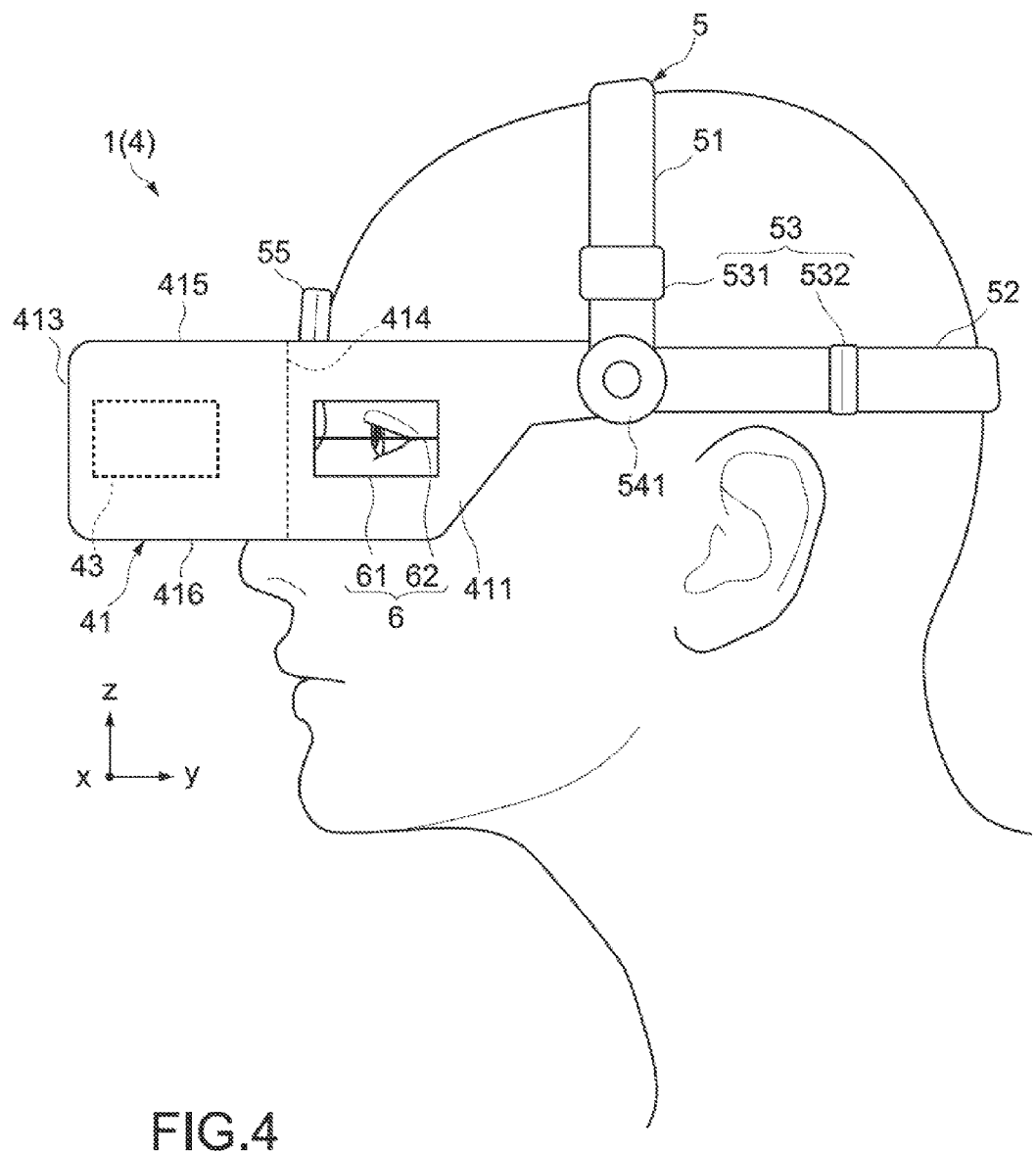
FIG. 4 is a schematic side view showing a state in which a wearer wears the head-mounted display according to the first embodiment of the present technology with a window portion being in a light-transmitting state.
Figure 5:
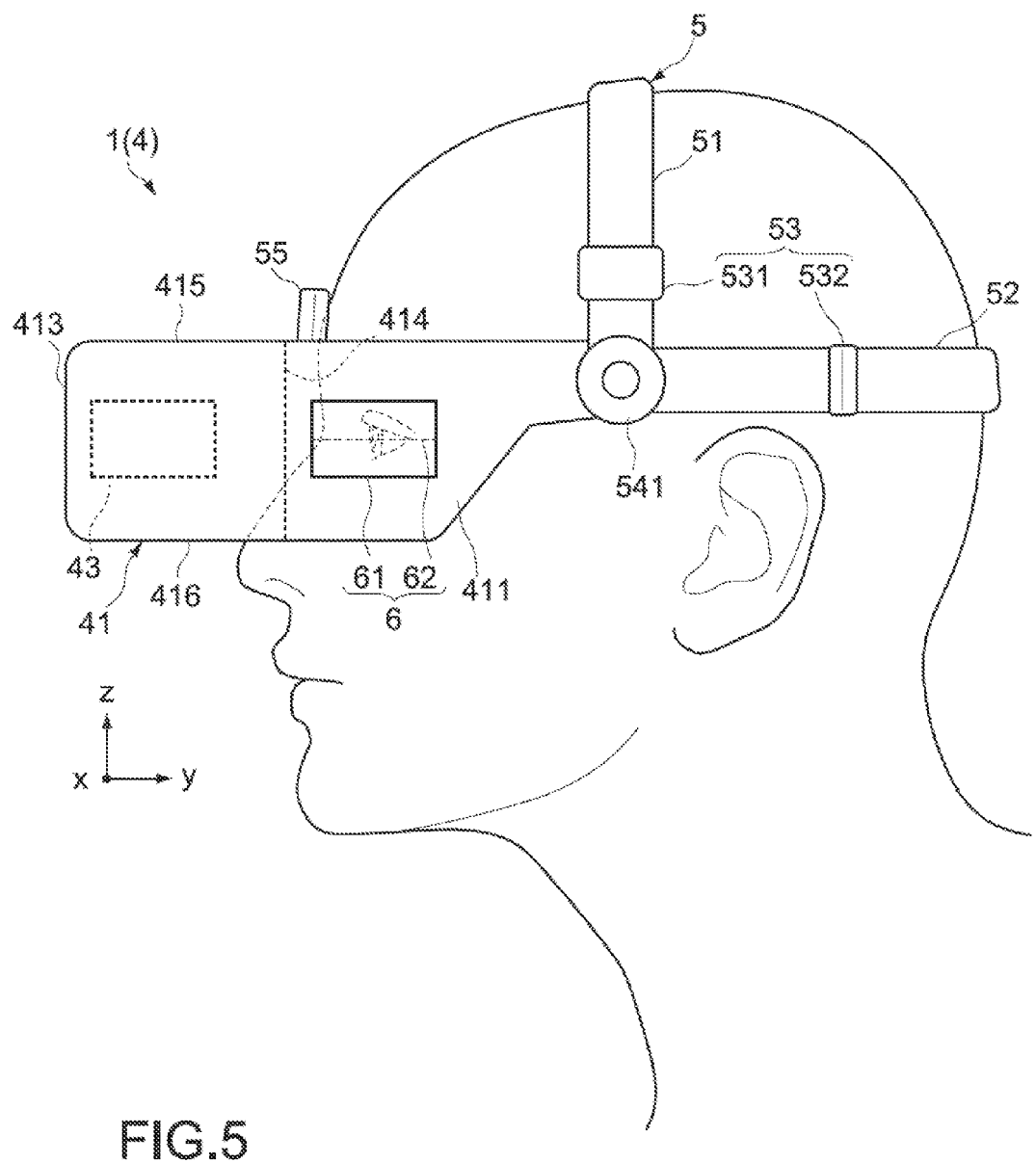
FIG. 5 is a schematic side view showing a state in which the wearer wears the head-mounted display according to the first embodiment of the present technology with the window portion being in a light-blocking state.
Figure 6:
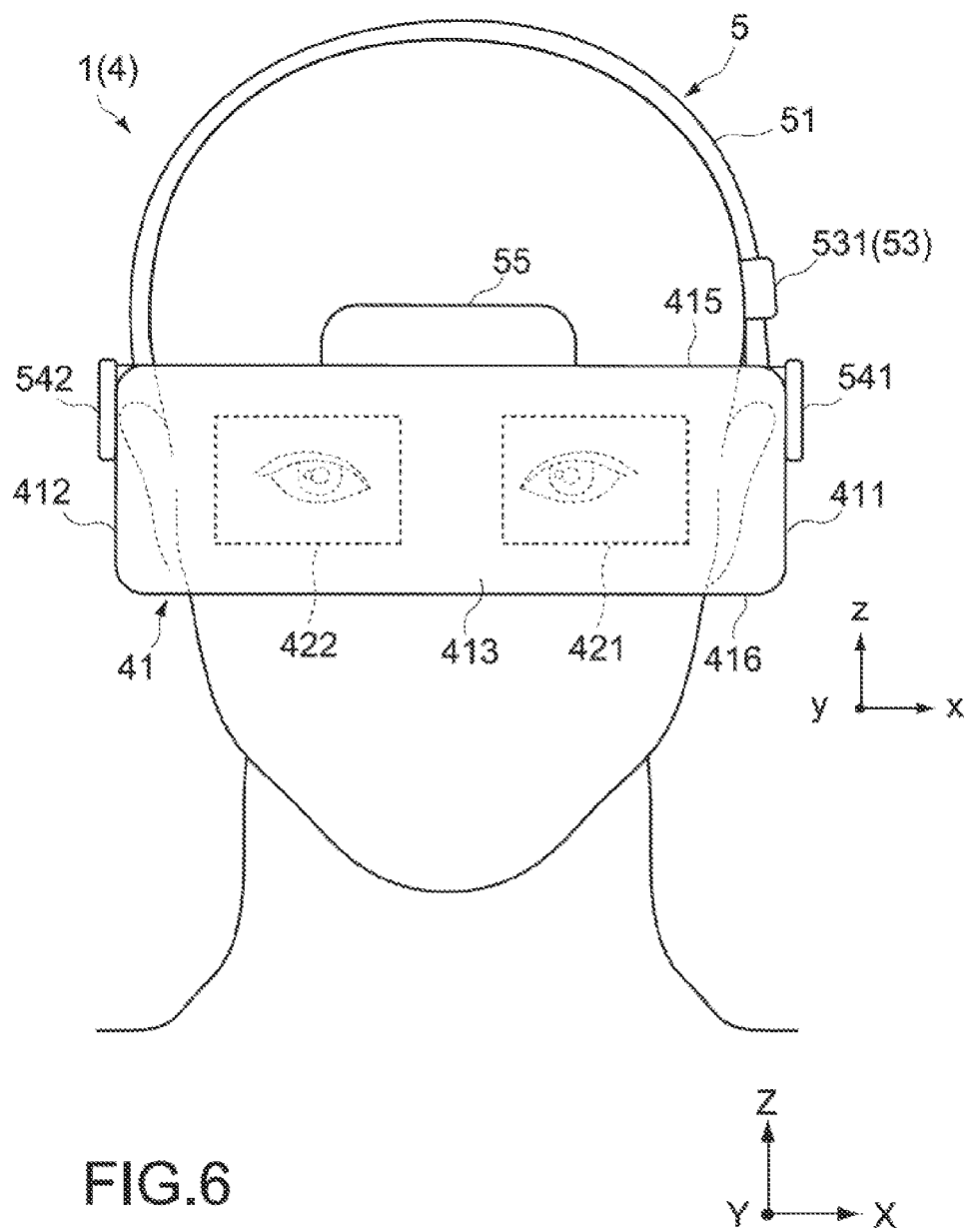
FIG. 6 is a schematic front view showing a state in which the wearer wears the head-mounted display according to the first embodiment of the present technology.
Figure 7:
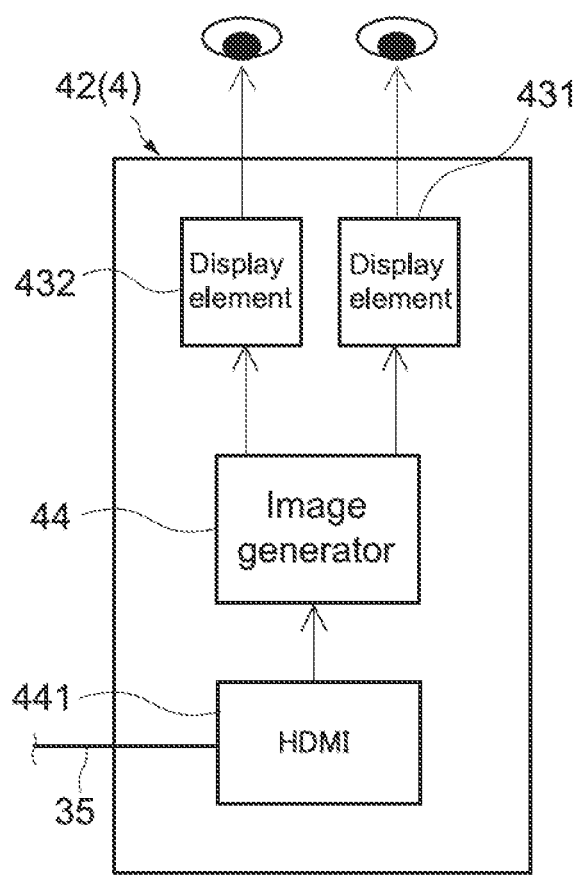
FIG. 7 is a block diagram showing a configuration of the head-mounted display (image display unit) according to the first embodiment of the present technology.

FIGS. 2 to 7 are views each showing the configuration of the HMD 1 according to this embodiment. FIG. 2 is a schematic side view. FIG. 3 is a schematic front view. FIGS. 4 and 5 are schematic side views each showing a state in which the wearer wears the HMD 1. FIG. 6 is a schematic front view showing the state in which the wearer wears the HMD 1. FIG. 7 is a block diagram showing a configuration of an image display unit. The HMD 1 includes a main body 4 and a reference portion 6. The HMD 1 according to this embodiment is formed of, for example, a goggle-shaped non-see-through HMD.

Note that, an x-axis direction and a y-axis direction in the figures each indicate a horizontal direction in an xyz coordinate system to which the HMD 1 belongs. The x-axis direction (second axis direction) corresponds to left and right directions of the main body 4. The y-axis direction (first axis direction) corresponds to front and rear directions of the main body 4, which are orthogonal to the x-axis direction. A z-axis direction indicates a direction orthogonal to the x-axis direction and the y-axis direction and corresponds to upper and lower directions of the main body 4.

Further, an X-axis direction and a Y-axis direction in the figures each indicate a horizontal direction in an XYZ coordinate system to which the wearer belongs, and an XY plane indicates a "horizontal plane." That is, the X-axis direction indicates left and right directions as viewed from the wearer and the Y-axis direction is orthogonal to the X-axis direction and indicates front and rear directions as viewed from the wearer (front and back directions of the wearer). A Z-axis direction is orthogonal to the X-axis direction and the Y-axis direction and indicates a vertical direction.

Hereinafter, configurations of the respective components will be described.

(Main Body)

The main body 4 includes a casing 41, an image display unit 42, and a mounting portion 5. The main body 4 is configured so that, when the mounting portion 5 is mounted on the head of the wearer, the casing 41 is located in front of the left and right eyes of the wearer.

The casing 41 is, as a whole, configured to fit the face, covering the left and right eyes of the wearer. The casing 41 includes a left side surface (first side surface) 411 and a right side surface (second side surface) 412 that are opposed to each other in the x-axis direction, a front surface 413 and an eye-side surface 414 that are opposed to each other in the y-axis direction, and an upper surface 415 and a lower surface 416 that are opposed to each other in the z-axis direction.

The eye-side surface 414 is configured to be opposed to the left and right eyes of the wearer in front of and in proximity to the left and right eyes. For example, in the center of the eye-side surface 414, a cutout may be formed corresponding to the nose shape of the wearer. Meanwhile, the front surface 413 is provided in front of the wearer wearing the HMD 1 and is formed to have a rectangular shape, for example. The left side surface 411 and the right side surface 412 may be located on the left- and right-hand sides of the face of the wearer, respectively, upon mounting. For example, the left side surface 411 and the right side surface 412 may be configured to cover up to (the vicinities of) the left and right temples of the wearer.

Upon mounting, the thus configured casing 41 can almost completely cover the eyes of the wearer. Thus, light from the outside is blocked and a clearer image can be presented.

Note that, the casing 41 is not limited to the above-mentioned configuration. For example, a configuration in which the left and right side surfaces 411 and 412, the front surface 413, the upper surface 415, and the lower surface 416 except for the eye-side surface 414 are smoothly coupled to one another to form a single outer surface may be used.

Referring to FIG. 7, the image display unit 42 includes left and right display surfaces 421 and 422, an image generator 44, and left and right display elements 431 and 432. The image display unit 42 is, as a whole, provided inside the casing 41 to serve as an image display apparatus that presents a predetermined image captured by the endoscope apparatus 2 to the wearer. Specifically, the image generator 44 first generates, based on image data acquired via the processor unit 3, image signals to be outputted to the left and right display elements 431 and 432, respectively. Then, the display elements 431 and 432 emit image light beams corresponding to those image signals to the display surfaces 421 and 422, respectively, so that images are presented to the wearer.

The display surfaces 421 and 422 are arranged on the eye-side surface 414 along the x-axis direction and are configured to be capable of displaying the left eye and right eye images to the eyes of the wearer, respectively. The shape and size of the display surfaces 421 and 422 are not particularly limited. In this embodiment, each of the display surfaces 421 and 422 has a rectangular shape with about 16 mm in the vertical direction and about 30 mm in the horizontal direction. The material of the display surfaces 421 and 422 is not particularly limited as long as it has a see-through property. For example, a plastic plate, a glass plate, or the like is used as the material of the display surfaces 421 and 422.

In this embodiment, the image generator 44 includes an image data conversion circuit or the like that converts the right eye and left eye image data sent from the processor unit 3 into the image signals for the HMD 1. The image generator 44 acquires endoscopic image data from an HDMI input terminal 441 connected to the cable 35.

In addition, the image generator 44 may perform predetermined offset processing or the like on the image data to generate left-eye and right-eye image signals suitable for the HMD 1. With this, it is possible to present a desired 3D image to the wearer. The amount of offset in the offset processing is calculated based on, for example, distances between eyes and the display elements 431 and 432 of the HMD 1, a distance between both eyes, or a virtual image position, which will be described later.

The image generator 44 outputs the generated left-eye and right-eye image data to the left and right display elements 431 and 432, respectively.

The left and right display elements 431 and 432 output, based on the image data inputted from the image generator 44, the image light beams to the left and right display surfaces 421 and 422. The display elements 431 and 432 are arranged to be respectively opposed to the display surfaces 421 and 422 in the y-axis direction, for example. With this, the optical axes of the image light beams, which are outputted from the display elements 431 and 432 and the display surfaces 421 and 422, become parallel to the y-axis direction.

In this embodiment, the display elements 431 and 432 are formed of organic EL (electroluminescence) elements. The use of the organic EL elements as the display elements 431 and 432 can achieve downsizing, high contrast, a rapid response, and the like.

As the display elements 431 and 432, for example, a plurality of red organic EL elements, green organic EL elements, blue organic EL elements, and the like are arranged in a matrix form. By being driven by a driving circuit of active matrix type, simple (passive) matrix type, or the like, these elements emit light by themselves at a predetermined timing with a predetermined luminance and the like. Further, the display elements 431 and 432 are configured to display a predetermined image by the driving circuit being controlled according to the image signals generated by the image generator 44.

Note that, the display elements 431 and 432 are not limited to the above-mentioned configuration. For example, a liquid crystal display (LCD) and the like may be used.

Between the display elements 431 and 432 and the display surfaces 421 and 422, for example, a plurality of eye lenses (not shown) are provided as optical systems. By causing these eye lenses and the eyes of the wearer to be opposed to each other with a predetermined distance therebetween, it is possible for the wearer to observe a virtual image as if the virtual image is displayed at a predetermined position (virtual image position). The virtual image position and the size of the virtual image are set depending on the configurations of the display elements 431 and 432 and the optical systems and the like. For example, the size of the virtual image is 750 inches adapted for a movie size and the virtual image position is set to be located at a position away from the wearer by about 20 m.

Here, in order to allow the wearer to observe the virtual image, the casing 41 is positioned with respect to the wearer so that the image light beams outputted from the display elements 431 and 432, with the y-axis direction being an optical direction thereof, form images respectively on the irises of the left and right eyes through the eye lenses and the like.

Therefore, in order to allow the wearer to observe the predetermined image, it is necessary to position the casing 41 so that a direction of the line of sight of the wearer substantially corresponds to an emitting direction of the image light, that is, the display surfaces 421 and 422 and the left and right eyes of the wearer are opposed to each other in the y-axis direction. Hereinafter, such a relative position of the casing 41 to the wearer is referred to as a "suitable relative position."

When the casing 41 is not located at the suitable relative position, an out-of-focus image or a blurred 3D image is generated and the wearer cannot view a desired image. Therefore, upon the mounting of the HMD 1, it is necessary to adjust the casing 41 to be located at the suitable relative position. Further, during the mounting, it is necessary to fix the casing 41 to the head to prevent this position from changing. In this embodiment, the relative position of the casing 41 is adjusted and fixed by the mounting portion 5, which will be described in the following.

The mounting portion 5 includes bands 51 and 52, an adjuster 53, left and right attachment members 541 and 542, and a forehead pad 55. The mounting portion 5 is provided to the casing 41 to be mountable on the head of the wearer so that the HMD 1 is located at the suitable relative position to the wearer, that is, the display surfaces 421 and 422 and the left and right eyes of the wearer are opposed to each other in the y-axis direction.

Referring to FIGS. 4 and 5, a schematic configuration of the mounting portion 5 according to this embodiment will be described. The bands 51 and 52 are attached via the casing 41 and the attachment members 541 and 542. The bands 51 and 52 each extend, for example, from the left side surface 411 of the casing 41 through the parietal region or the occipital region of the wearer to the right side surface 412. In addition, the adjuster 53 is configured to be capable of adjusting the length of the bands 51 and 52, and hence the relative position of the casing 41 to the wearer in a height direction and the front and rear directions can be adjusted. Further, the forehead pad 55 is configured to be able to abut against the forehead of the wearer. By adjusting the length of the band 52 passing through the occipital region, it is possible to fix the relative position in the front and rear directions of the wearer through the forehead pad 55 and the band 52.

The bands 51 and 52 both include, for example, two short bands to be attached to the attachment members 541 and 542. The bands 51 and 52 are configured to become a single band as a whole by these short bands being overlapped with each other by a predetermined length and fixed. The adjuster 53, which will be described later, is used for the fixing. Further, for the material of the bands 51 and 52, for example, a rubber, plastic, cloth, or the like is used in view of strength and flexibility thereof.

In this embodiment, the adjuster 53 adjusts the relative position of the casing 41 to the wearer. The adjuster 53 is attached to, for example, each of the bands 51 and 52 and includes adjustment members 531 and 532 capable of adjusting the length of the bands 51 and 52 from the attachment member 541 to the attachment member 542.

For each of the adjustment members 531 and 532, for example, a configuration of a buckle or a latch used for a belt or the like may be used. With this configuration, it is possible to arbitrarily fix and change the overlapping length of the respective two short bands of the bands 51 and 52, and the length of the bands 51 and 52 can be changed. The configurations of the adjustment members 531 and 532 are not particularly limited, and may be appropriately selected depending on the material, shape, and the like of the bands 51 and 52.

In this embodiment, the left and right attachment members 541 and 542 are provided to the left and right side surfaces 411 and 412, respectively. The configurations of the attachment members 541 and 542 are not particularly limited. For example, a swaging configuration in which the bands 51 and 52 are, at one ends thereof, overlapped with each other and attached to the casing 41 may be used. Further, the attachment members 541 and 542 may be configured so that the bands 51 and 52 are each rotatable with respect to the casing 41 within a predetermined angle range.

The forehead pad 55 is provided to protrude from the eye-side surface 414 of the casing 41 above the upper surface 415, for example. The configuration of the forehead pad 55 is not particularly limited and a cushion configuration is used for a surface to abut against the wearer in view of a wearing comfort of the wearer and the like. Further, if necessary, the angle with respect to the casing 41 and the height position of the forehead pad 55 in the z-axis direction may be configured to be adjustable. In addition, if necessary, the forehead pad 55 may be configured to be detachable.

(Reference Portion)

In this embodiment, the reference portion 6 includes a window portion 61 and an indicator (mark) 62. The reference portion 6 is configured to allow the adjustment of the relative position of the main body 4 to the wearer by adjusting the eye of the wearer visible from the outside through the window portion 61 using the position of the mark 62 as an index.

In this embodiment, the window portion 61 is provided in the left side surface 411 of the casing 41. More specifically, the window portion 61 is provided to be substantially opposed to the eye of the wearer in the x-axis direction from the left-hand side of the wearer upon the mounting. Further, the window portion 61 has typically a rectangular shape. However, the shape and size thereof are not particularly limited as long as the eye of the wearer is sufficiently visible under a light-transmitting state, which will be described later.

In this embodiment, the window portion 61 is configured to be capable of switching between the light-transmitting state and a light-blocking state. FIGS. 4 and 5 are schematic side views each showing a state in which the wearer wears the HMD 1. FIG. 4 shows a state in which the window portion 61 is in the light-transmitting state. FIG. 5 shows a state in which the window portion 61 is in the light-blocking state. In this embodiment, the window portion 61 is formed of a liquid crystal shutter. With this, the window portion 61 is allowed to switch between the light-transmitting state and the light-blocking state by a driving voltage from a driving source (not shown) being controlled. The switching between the light-transmitting state and the light-blocking state according to the window portion 61 may be performed by a switch or the like provided to, for example, the casing 41 or the processor unit 3.

For example, the window portion 61 is capable of making the eye of the wearer visible from the outside by being in the light-transmitting state upon the adjustment of the relative position. Meanwhile, by being switched to the light-blocking state upon image observation, the window portion 61 is capable of suppressing incident light from the outside to a gap between the casing 41 and the eyes of the wearer, to thereby present a clearer image.

The mark 62 is provided to, for example, the window portion 61 to indicate the positions of the display surfaces 421 and 422 and the y-axis direction being the emitting direction of the image light. For example, as the positions of the display surfaces 421 and 422, the mark 62 indicates a height position of the centers (that is, intersections of the diagonals) of the display surfaces 421 and 422 along the z-axis direction (hereinafter, abbreviated as "height position"). Specifically, the mark 62 is formed of a single straight line extending in the y-axis direction at the height position of the centers of the display surfaces 421 and 422. With such a mark 62, it is possible to check the positions of the display surfaces 421 and 422 and the emitting direction of the image light emitted from the display surfaces 421 and 422.

For example, the mark 62 may be formed of a seal attached onto the window portion 61 or may be drawn on the window portion 61 with paint or the like. Alternatively, the mark 62 may be formed by, for example, molding a transparent plate with two colors and the transparent plate may be placed on the window portion 61.

With the thus configured reference portion 6, it is possible to adjust the relative position of the casing 41 to the eye of the wearer while checking the position of the eye of the wearer through the window portion 61. Specifically, for the adjustment, the center of the eye (position of pupil) is overlapped with the mark 62 so that a direction of the line of sight of the wearer (direction almost orthogonal to surface of eyeball) corresponds to an extending direction of the mark 62. With this, it is possible to cause the eyes of the wearer and the display surfaces 421 and 422 to be opposed to each other in the y-axis direction, that is, the emitting direction of the image light from the display surfaces 421 and 422. Thus, the main body 4 can be located at the suitable relative position to the wearer.

Hereinafter, an example of a mounting method for the HMD 1 according to this embodiment will be described. Here, an example in which, in the case where a wearer who tries to perform an endoscopic surgery using the endoscope apparatus 2 has already performed hand antisepsis, and hence the wearer cannot adjust the relative position of the HMD 1 by himself or herself, a mounting helper (hereinafter, abbreviated as helper) near the wearer, such as a surgery assistant, mounts the HMD 1 on the wearer will be described.

[Mounting Method Example]

First, the HMD 1 is prepared by the helper adjusting the bands 51 and 52 to be longer than the length expected upon mounting. At this time, the main body 4 and the window portion 61 of the HMD 1 may be activated in advance. With this, the window portion 61 can be put in the light-transmitting state. Further, for example, the helper performs the preparation standing on the left-hand side of the wearer, if necessary, with a step in order to put the helper at a height to easily assist the mounting of the HMD 1.

Next, the helper mounts the HMD 1 on the head from above the wearer, and the length of the bands 51 and 52 is preliminarily adjusted via the adjustment members 531 and 532. The bands 51 and 52 at this time are set to have an extra length so that the relative position of the HMD 1 to the wearer is not fixed and the relative position can be adjusted. Further, the band 51 is attached to the parietal region of the wearer and the band 52 is attached to the occipital region of the wearer.

In addition, the relative position of the HMD 1 to the wearer is adjusted. At this time, by putting the window portion 61 in the light-transmitting state, the helper can check the position of the (left) eye of the wearer through the window portion 61 from the left-hand side of the wearer. In addition, the relative position of the main body 4 is adjusted in such a manner that the eye of the wearer is overlapped with the mark 62 so that the line of sight corresponds to the extending direction of the mark 62 while referring to the mark 62. With this, the main body 4 is located so that the display surfaces 421 and 422 and the eyes of the wearer are substantially opposed to each other in the y-axis direction. At this time, if necessary, the length of the band 51 may be adjusted by the adjustment member 531. Further, here, the bands 51 and 52 are adjusted to have an extra length, the adjustment of the relative position of the casing 41 can be easily performed.

After the adjustment is performed so that the main body 4 is located at the suitable relative position, the length of the band 52 is adjusted so that the relative position of the HMD 1 is fixed. Here, by adjusting the length of the band 52 to be shorter via the adjustment member 532 and sandwiching the head of the wearer by the forehead pad 55 and the band 52 in the front and rear directions, the relative position of the main body 4 to the wearer in the front and rear directions is defined.

As described above, by the HMD 1 according to this embodiment being mounted so that the eye of the wearer, which is checked through the window portion 61, is overlapped with the mark 62 in the x-axis direction, it is possible to cause the display surfaces 421 and 422 and the eyes of the wearer to be opposed to each other in the y-axis direction, that is, the emitting direction of the image light. With this, even the helper who has difficulties for grasping the position relationships between the eyes of the wearer and the display surfaces 411 and 412 can adjust the relative position of the HMD 1 to be the suitable relative position while referring to the mark 62.

Therefore, for example, even in the case where it is necessary to mount the HMD 1 during a surgery, the HMD 1 can be mounted at the suitable relative position without the wearer touching the HMD 1 by himself or herself. Further, with this, it becomes possible for the wearer to smoothly perform the endoscopic surgery while viewing comfortable 3D images.

Further, even in the case where the wearer cannot turn his or her face toward the helper, the window portion 61 and the mark 62 are provided in the left side surface 411 of the casing 41, and hence the helper can easily adjust the relative position on the side of the wearer.

In addition, the window portion 61 according to this embodiment is configured to be capable of switching between the light-transmitting state and the light-blocking state through the liquid crystal shutter. Therefore, in order to observe an image, the window portion 61 can be put in the light-blocking state, to thereby suppress incident light from the outside. With this, it is possible to make the eye of the wearer visible upon the mounting, to thereby allow the adjustment of the relative position and to put the gap between the wearer and the casing 41 in the light-blocking state upon the image observation, to thereby make the image displayed by the display surfaces 421 and 422 more visible.

In addition, by the mounting portion 5 having the above-mentioned configuration, the length of the bands 51 and 52 can be easily changed, and hence it becomes possible for the helper to easily perform the mounting, the adjustment and fixing of the relative position, and the like.

Second Embodiment

Figure 10:
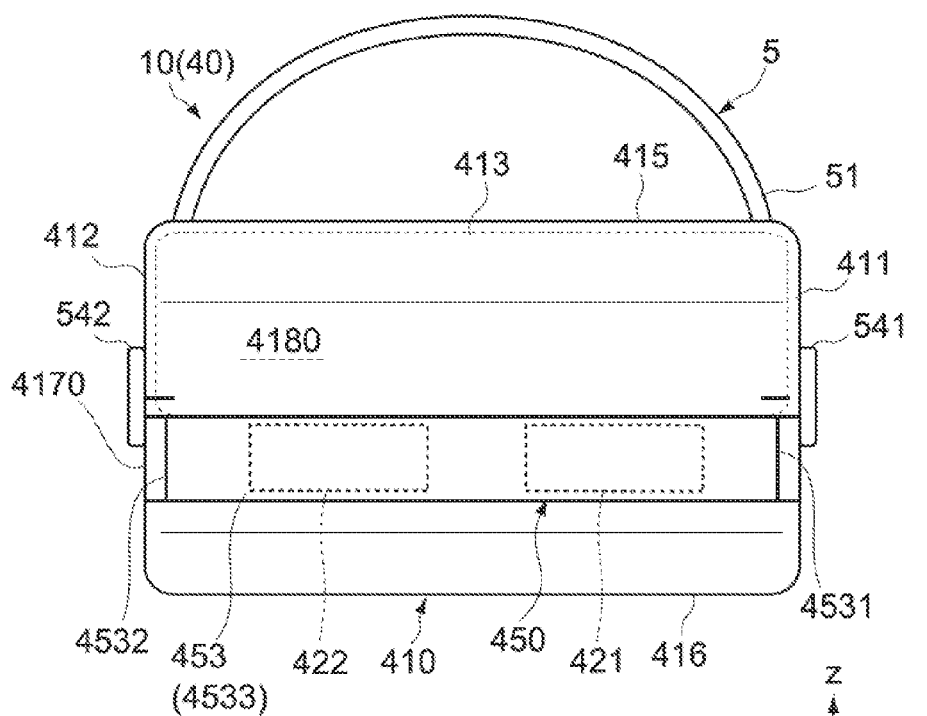
FIG. 10 is a schematic front view showing the head-mounted display according to the second embodiment of the present technology with the movable member being at the first position.
Figure 11:
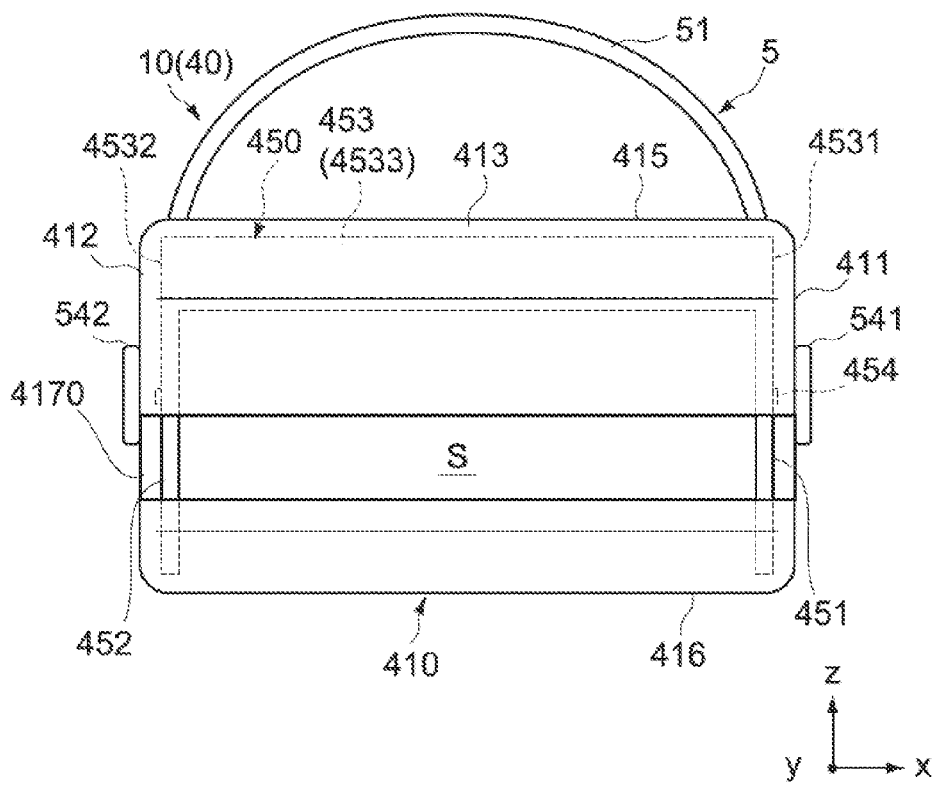
FIG. 11 is a schematic front view showing the head-mounted display according to the second embodiment of the present technology with the movable member being at the second position.
Figure 12:
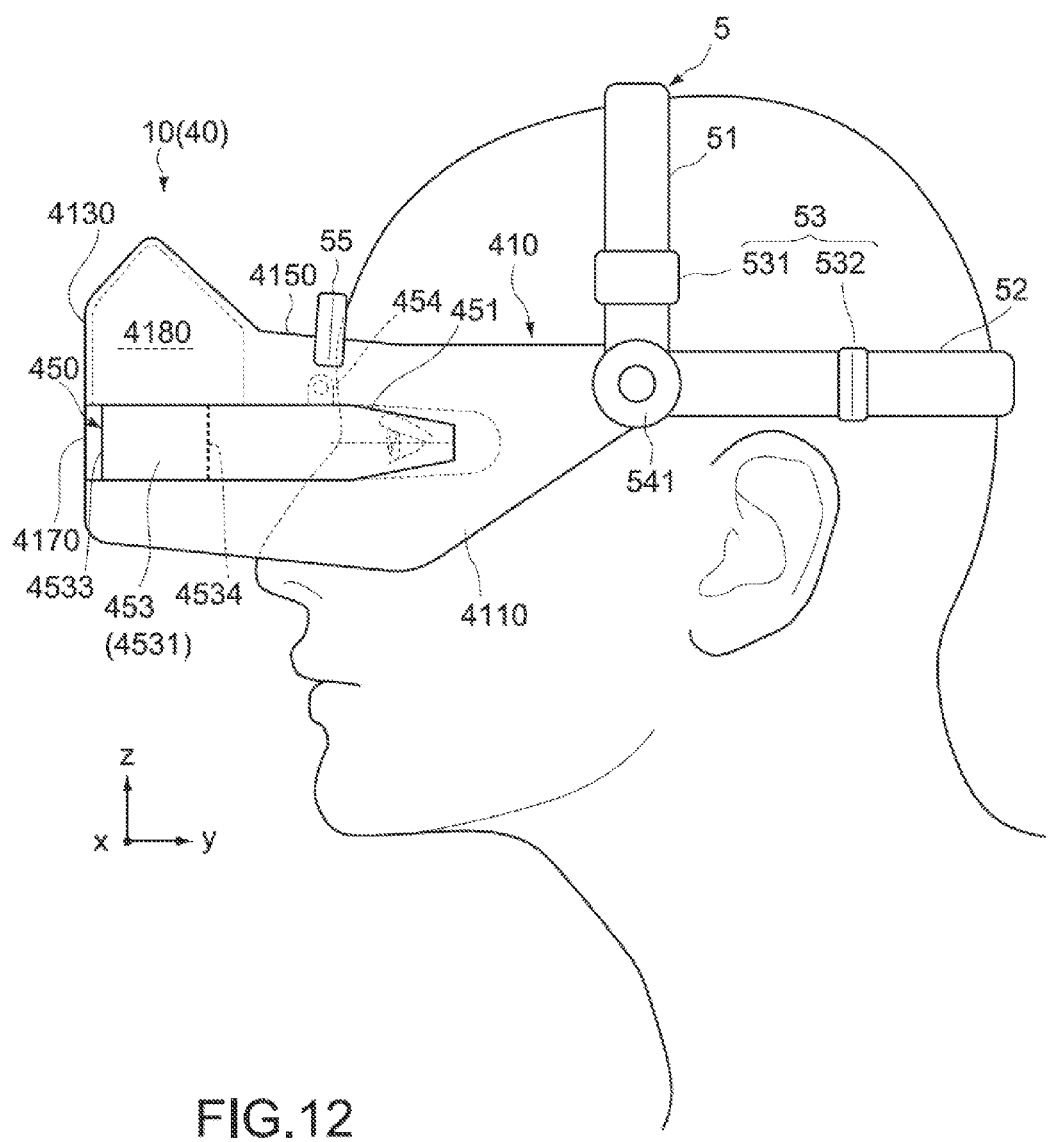
FIG. 12 is a schematic side view showing a state in which the wearer wears the head-mounted display according to the second embodiment of the present technology with the movable member being at the first position.
Figure 13:
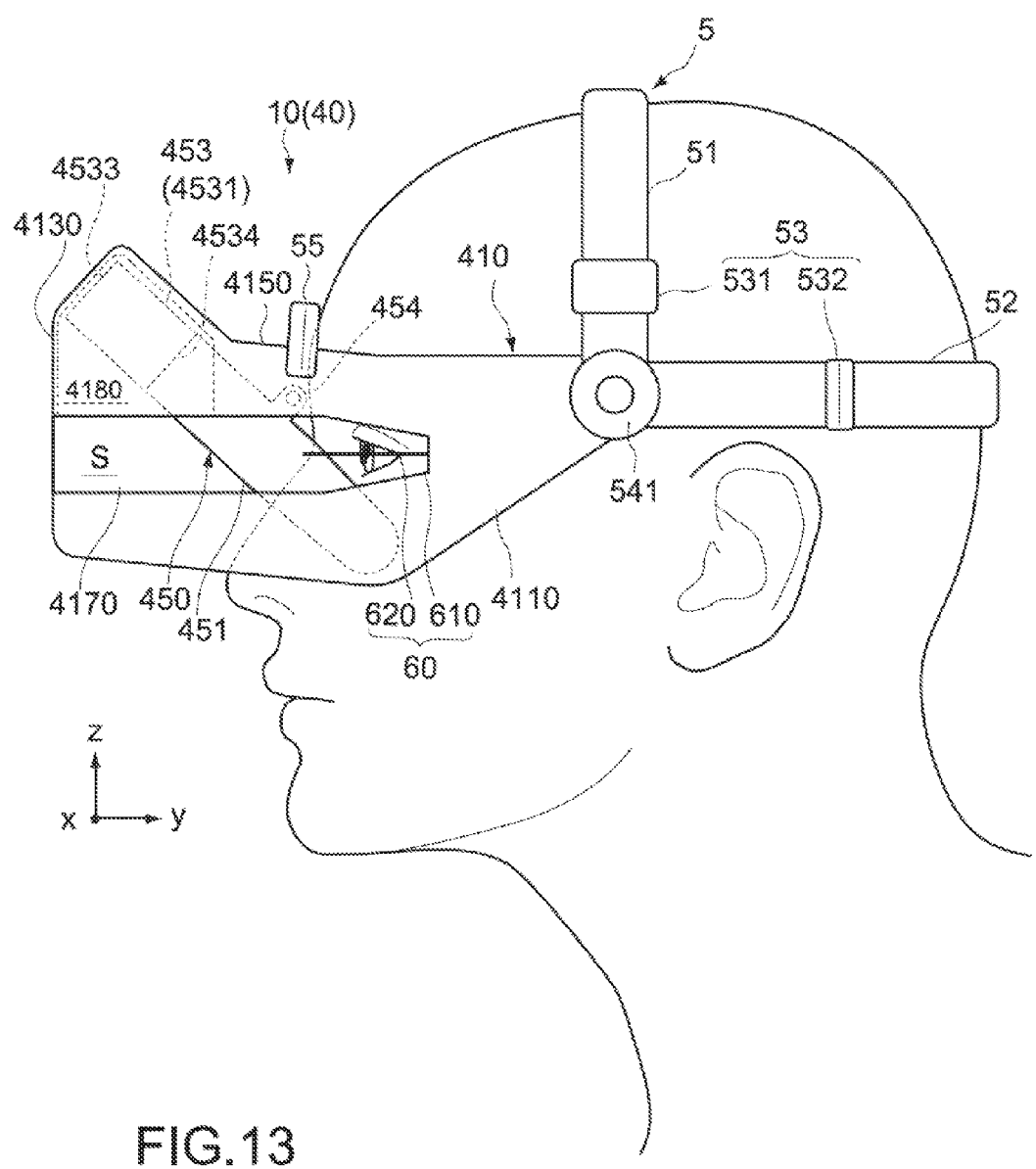
FIG. 13 is a schematic side view showing a state in which the wearer wears the head-mounted display according to the second embodiment of the present technology with the movable member being at the second position.

FIGS. 8 to 13 are views each showing a configuration of an HMD 10 according to a second embodiment of the present technology. FIGS. 8 and 9 are schematic side views. FIGS. 10 and 11 are schematic front views. FIGS. 12 and 13 are schematic side views each showing a state in which the wearer wears the HMD 10. Note that, in the figures, parts corresponding to those of the first embodiment described above will be denoted by the same reference signs and detailed descriptions thereof will be omitted.

This embodiment is different from the first embodiment mainly in that a main body 40 includes a movable member 450 configured to open and close a window portion 610 of a reference portion 60. The movable member 450 is configured to support the display surfaces 421 and 422 and present an image to the wearer at such a position that the window portion 610 is closed.

A casing 410 according to this embodiment includes, as in the first embodiment, a left side surface 4110, a right side surface 4120, a front surface 4130, an upper surface 4150, and a lower surface 4160 and does not include the eye-side surface. An opening portion 4170 is formed in the front surface 4130 and the left and right side surfaces 4110 and 4120. The eye-side surface and display surfaces 4210 and 4220 that are not included in the casing 410 are provided to the movable member 450, which will be described later.

The main body 40 has a space S formed in the opening portion 4170 in a depth direction. The space S is configured to be capable of housing the movable member 450 at the first position, which will be described later. In addition, surrounded by the upper surface 4150, the left and right side surfaces 4110 and 4120, and the front surface 4130 of the casing 410, a housing area 4180 configured to be capable of housing a part of the movable member 450 at the second position is formed.

Meanwhile, as in the first embodiment, the window portion 610 is provided in the left side surface 4110. The window portion 610 is provided with a mark 620 having the same shape as that of the first embodiment, for example. The window portion 610 is formed integrally with the opening portion 4170 in this embodiment.

The opening portion 4170 and the window portion 610 are formed of, for example, a translucent plastic plate, a glass plate, or the like. With this, the opening portion 4170 and the window portion 610 have a light-transmitting property, and hence the field of view of the wearer can be ensured and the eye of the wearer can be made visible through the window portion 610. In addition, it is possible to enhance the strength of the main body 40 and to prevent foreign matter from entering the space S. Thus, a safer configuration can be achieved.

The movable member 450 is configured to be movable between the first position for closing the window portion 610 and the second position for opening the window portion 610. FIGS. 8, 10, and 12 are schematic side and front views each showing a state in which the movable member 450 is located at the first position. FIGS. 9, 11, and 13 are schematic side and front views each showing a state in which the movable member 450 is located at the second position.

In this embodiment, at the first position, the display surfaces 421 and 422 present an endoscopic image and the like to the wearer. Meanwhile, at the second position, the opening portion 4170 ensures the field of view in front of and on the sides of the wearer. At the same time, the helper or the like in the outside can see the eye of the wearer through the window portion 610, which allows the adjustment of the relative position of the main body 40.

That is, the movable member 450 includes two movable plates (first area) 451 and 452 and a movable casing (second area) 453. The movable plates 451 and 452 are opposed to each other in the x-axis direction. The movable casing 453 is coupled to the movable plates 451 and 452 and supports the display surfaces 421 and 422. The movable plates 451 and 452 open and close the window portion 610 due to the movement between the first and second positions. Further, the movable casing 453 is opposed to the opening portion 4170 at the first position.

In addition, in this embodiment, the movable member 450 includes a movable shaft 454 that is provided to be capable of rotating the movable plates 451 and 452 with respect to the main body 40 and extends in the x-axis direction. With this, the movable member 450 is configured to rotate about the movable shaft 454 (x-axis) and to be movable between the first position and the second position. Specifically, the movable member 450 is configured to rotate upward in the vertical direction about the x-axis to move from the first position at which the movable member 450 is housed in the space S to the second position.

The driving method for the movable member 450 is not particularly limited. For example, the movable member 450 may be manually driven by the wearer or the helper. With this, the apparatus configuration can be simplified.

Alternatively, the movable member 450 may be automatically movable by a driving source such as a motor. With this, for example, even in the case where the wearer or the helper cannot directly touch the HMD 10, for example, during a surgery, a switch or the like provided to the processor unit 3 or the like can move the movable member 450.

The movable casing 453 is housed in the space S at the first position. Specifically, the movable casing 453 includes left and right side surfaces 4531 and 4532 arranged to be opposed to each other in the x-axis direction at the first position, and a front surface 4533 and an eye-side surface 4532 that are arranged to be opposed to each other in the y-axis direction at the first position. The left and right side surfaces 4531 and 4532 are supported by the movable plates 451 and 452, respectively.

Further, the left and right display surfaces 421 and 422 are arranged in an eye-side surface 4534 of the movable casing 453. Further, inside the movable casing 453, the image generator 44 of the image display unit 42 and the left and right display elements 431 and 432 are provided. With this, in the movable casing 453 at the first position, the display surfaces 421 and 422 are configured to emit the image light in the y-axis direction.

Further, at the first position, the movable plates 451 and 452 are configured to close the window portion 610 and a part of the opening portion 4170. Further, at the first position, the front surface 4533 and the left and right side surfaces 4531 and 4532 of the movable casing 453 are also configured to be opposed to the opening portion 4170 and close the opening portion 4170. In this embodiment, the movable plates 451 and 452, the front surface 4533, and the left and right side surfaces 4531 and 4532 are continuously provided. Therefore, at the first position, the window portion 610 and the opening portion 4170 are wholly closed. Therefore, when an image is presented to the wearer at the first position, the external light is blocked, and hence a clearer image can be presented to the wearer.

At the second position, the movable casing 453 is housed in the housing area 4180 formed inside the casing 410. With this, the opening portion 4170 is opened, and hence the field of view in front of and on left- and right-hand sides of the wearer can be ensured through the space S.

Further, at the second position, by the movable plates 451 and 452 rotating about the movable shaft 454, the window portion 610 is opened and the eye of the wearer is made visible through the window portion 610. With this, while checking the position of the eye of the wearer through the window portion 610, it is possible to adjust the relative position of the main body 40 to the eye of the wearer.

In the above-mentioned embodiment, the main body 40 includes the movable member 450, and hence it is possible to switch, for example, between an image display mode in which an image is presented to the wearer and a peripheral-vision-ensuring mode in which the field of view of the wearer is ensured. With this, even in a state in which the wearer wears the HMD 10, a peripheral vision can be ensured by moving the movable member 450. Therefore, for example, even in the case where treatments other than the endoscopic surgery is performed, the treatments can be performed in a state in which the wearer wears the HMD 10. Thus, it is possible to quickly shift to the endoscopic surgery only by moving the position of the movable member 450.

Further, also in this embodiment, as in the first embodiment, due to the provision of the reference portion 60, it is possible to open the window portion 610 and adjust the relative position of the casing 410 to the wearer to be a suitable position with the movable member 450 being at the second position.

In addition, after the casing 410 is adjusted to be located at the suitable relative position referring to the reference portion 60, the relative position can be maintained by the mounting portion 5 having the same configuration as that of the first embodiment. Therefore, the adjustment of the relative position every time the mode is shifted to the image display mode becomes unnecessary. Therefore, for example, even during a time-sensitive surgery, it is possible to more quickly shift between the endoscopic surgery and the other treatments.

Third Embodiment

Figure 16:
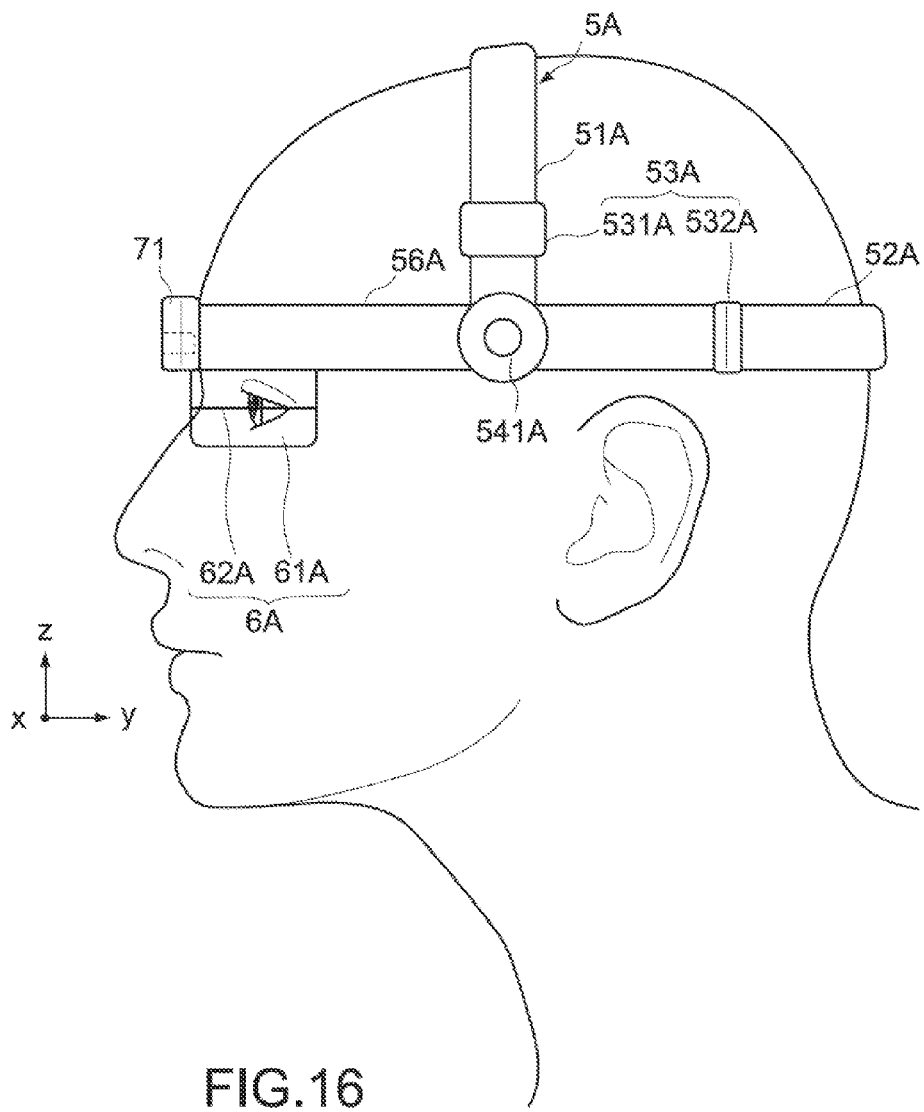
FIG. 16 is a schematic side view showing a state in which the wearer wears the head-mounted display according to the third embodiment of the present technology with only the mounting portion separated from the casing being mounted.
Figure 17:
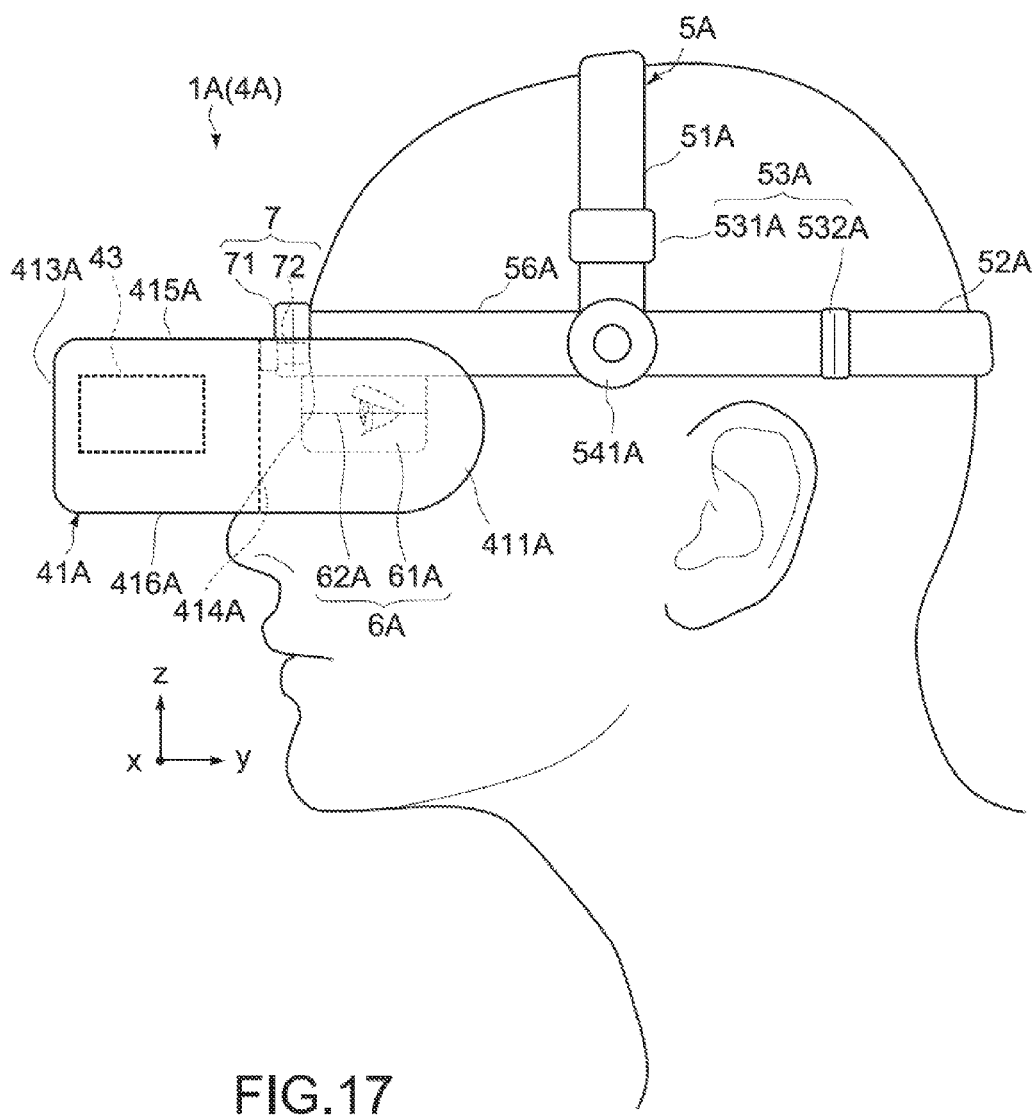
FIG. 17 is a schematic side view showing a state in which the wearer wears the head-mounted display according to the third embodiment of the present technology with the casing and the mounting portion coupled to each other being mounted.

FIGS. 14 to 17 are views each showing a configuration of an HMD 1A according to a third embodiment of the present technology. FIGS. 14 and 15 are schematic side views. FIGS. 16 and 17 are schematic side views each showing a state in which the wearer wears the HMD 1A. Note that, in the figures, parts corresponding to those of the first embodiment described above will be denoted by the same reference signs and detailed descriptions thereof will be omitted.

Further, FIGS. 14 and 16 are schematic side views each showing a state in which a mounting portion 5A and a casing 41A are separated from each other. FIGS. 15 and 17 are schematic side views each showing a state in which the mounting portion 5A and the casing 41A are coupled to each other. This embodiment is different from the first embodiment mainly in that the mounting portion 5A includes a coupler 7 that detachably couples the casing 41A and the mounting portion 5A to each other. Further, a reference portion 6A is provided to the mounting portion 5A to display, to the outside, the relative position of the eye of the wearer to the coupler 7.

In this embodiment, the mounting portion 5A includes bands 51A and 52A and a band 56A. The bands 51A and 52A are attached to the parietal region and the occipital region of the wearer, respectively. The band 56A is attached to the frontal region of the wearer. The bands 51A and 52A are attached via the band 56A and attachment members 541A and 542A. An adjuster 53A (adjustment members 531A and 532A) having the same configuration as that of the first embodiment is provided thereto.

Meanwhile, the band 56A is attached to the frontal region (e.g., forehead) of the wearer. In addition, the band 56A is provided with the coupler 7. Further, in this embodiment, the band 56A is provided with the reference portion 6A.

In this embodiment, the reference portion 6A is configured to display, to the outside, the relative position of the eye of the wearer to the coupler 7 under a state in which the casing 41A is separated from the mounting portion 5A, that is, a state in which only the mounting portion 5A is mounted.

Specifically, the reference portion 6A includes a window portion 61A and a mark 62A. The window portion 61A has a rectangular panel shape and the light-emitting property. The window portion 61A is provided on, for example, a left lower side of the coupler 7 of the band 56A so that the eye (e.g., left eye) of the wearer can be seen through the window portion 61A when the wearer wears the mounting portion 5A. Meanwhile, the mark 62A has the same configuration as that of the first embodiment. That is, the mark 62A is provided, on the window portion 61A, at a height position that is opposed in the X-axis direction to the centers of the display surfaces 421 and 422 provided to the coupled casing 41A. The mark 62A has a single straight line shape extending in the y-axis direction.

As in the first embodiment, the adjustment of the relative position of the eye of the wearer to the coupler 7 using the reference portion 6A is performed in such a manner that the center of the eye (position of pupil) is overlapped with the mark 62A in the x-axis direction so that the direction of the line of sight corresponds to the extending direction of the mark 62A. With this, when the mounting portion 5A and the casing 41A are coupled to each other by the coupler 7, the eyes of the wearer and the display surfaces 421 and 422 can be opposed to each other in the y-axis direction, that is, the emitting direction of the image light from the display surfaces 421 and 422.

The coupler 7 is configured to allow the mounting portion 5A and the casing 41A to be detachable from each other. When the mounting portion 5A is mounted at the suitable relative position and the mounting portion 5A and the casing 41A are coupled to each other, the coupler 7 is configured to perform the coupling so that the display surfaces 421 and 422 and the eyes of the wearer are opposed to each other in the y-axis direction and fix the positions thereof.

The configuration of the coupler 7 is not particularly limited as long as the relative position of the casing 41A to the mounting portion 5A can be fixed. For example, the coupler 7 may have the same configuration as that of a one-touch coupler. Specifically, the coupler 7 includes an inserted portion 71 and an insertion end portion 72. The inserted portion 71 is provided to the band 56A. The insertion end portion 72 is provided on the casing 41A side and can be inserted into the inserted portion 71.

The inserted portion 71 is configured to be capable of receiving the insertion end portion 72 in the y-axis direction, for example. In addition, the inserted portion 71 includes a locking mechanism including, for example, a well-known spring structure and is configured to be capable of fixing the position of the insertion end portion 72 inserted therein by a predetermined length. With this configuration, by inserting the insertion end portion 72 on the casing 41A side into the inserted portion 71, the position of the casing 41A to the mounting portion 5A is fixed.

Note that, the casing 41A according to this embodiment has the same configuration as that of the first embodiment as a whole. That is, the casing 41A includes a left side surface (first side surface) 411A and a right side surface (second side surface) 412A that are opposed to each other in the x-axis direction, a front surface 413A and an eye-side surface 414A that are opposed to each other in the y-axis direction, and an upper surface 415A and a lower surface 416A that are opposed to each other in the z-axis direction.

The left and right side surfaces 411A and 412A are configured to cover the left- and right-hand sides of the eyes of the wearer. With this, the left and right side surfaces 411A and 412A cover the eyes of the wearer from the left- and right-hand sides so that the external light is blocked. Thus, it is possible to observe a clearer image. Further, the reference portion 6A, which will not be referred to after the coupling, may be housed in the left and right side surfaces 411A and 412A.

Next, an example of a mounting method for the HMD 1A according to this embodiment will be described. Here, a case where the wearer wears only the separated mounting portion 5A by himself or herself while viewing a mirror or the like before a surgery and the casing 41A is coupled thereto by the helper or the like during the surgery will be described.

First, the HMD 1A in a state in which the casing 41A and the mounting portion 5A are separated from each other is prepared. Here, as in the first embodiment, the bands 51A and 52A are adjusted to be longer than the length expected upon mounting.

Next, the wearer mounts the mounting portion 5A on the head from above the wearer and the length of the bands 51A and 52A is preliminarily adjusted via the adjustment members 531A and 532A. The band 51A is attached to the parietal region of the wearer, the band 52A is attached to the occipital region of the wearer, and the band 56A is attached to the frontal region of the wearer.

In addition, the relative position of the HMD 1A to the wearer is adjusted. Here, by the wearer checking the position of his or her (left) eye through the window portion 61A from the left side of the wearer and referring to the mark 62A by himself or herself, the relative position of the inserted portion 71 is adjusted so that the mark 62A and his or her eye are overlapped with each other in the x-axis direction. With this, after the coupling, the relative position is adjusted so that the main body 4 is positioned such that the display surfaces 421 and 422 and the eyes of the wearer are substantially opposed to each other in the y-axis direction.

After the position of the mounting portion 5A is adjusted to be the suitable relative position, the length of the band 52A is adjusted so that the relative position is fixed. Here, by adjusting the length of the band 52A to be shorter via the adjustment member 532A and sandwiching the head in the front and rear directions of the wearer by the inserted portion 71 and the band 52A, the relative position of the mounting portion 5A to the wearer in the front and rear directions is defined.

The wearer wearing only the mounting portion 5A performs treatments for which the HMD 1A is unnecessary. In order to start the endoscopic surgery during the surgery, in place of the wearer who have performed hand antisepsis, the helper couples the casing 41A of a main body 4A to the mounting portion 5A via the coupler 7. For example, the insertion end portion 72 on the casing 41A side is inserted into the inserted portion 71 in the y-axis direction by a predetermined length until the insertion end portion 72 is locked by the inserted portion 71 on the mounting portion 5A side.

With this, the casing 41A and the mounting portion 5A are quickly coupled to each other. Thus, the HMD 1A is allowed to present the endoscopic image to the wearer. At this time, the mounting portion 5A has already been adjusted to be located at the suitable relative position to the wearer by referring to the reference portion 6A, and hence the HMD 1A is, as a whole, adjusted to be located at the suitable relative position without adjusting the relative position after the coupling.

As described above, the HMD 1A according to this embodiment is configured so that the mounting portion 5A and the casing 41A are detachable via the coupler 7. In addition, when only the separated mounting portion 5A is mounted, the relative position of the coupler 7 to the wearer is adjusted by referring to the reference portion 6A. With this, the HMD 1A can be mounted to be located at the suitable relative position after the coupling. Therefore, the adjustment of the relative position every time the HMD 1A is mounted becomes unnecessary. Thus, it is possible to reduce a time for mounting the HMD 1A.

Further, with this, when the treatments other than the endoscopic surgery for which images presented by the HMD 1A are unnecessary are performed, the treatments can be performed by the wearer wearing only the mounting portion 5A. Therefore, it is possible to reduce loads on the wearer.

Further, the reference portion 6A according to this embodiment is capable of adjusting the relative position to the coupler 7 provided to the mounting portion 5A, and hence the wearer wearing only the mounting portion 5A can adjust the relative position by himself or herself, for example, before the surgery. With this, the wearer can have a desired wearing comfort. At the same time, it is possible to reduce loads on the helper or the like for assisting the mounting of the main body 4A (casing 41A).

Although the embodiments of the present technology are described above, the present technology is not limited thereto and various modifications can be made based on the technical concept of the present technology.

In the first embodiment, the reference portion 6 includes the window portion 61 and the mark 62, and the mark 62 is the single straight line provided to extend in the y-axis direction at the height position of the centers of the display surfaces 421 and 422. However, the reference portion 6 is not limited thereto as long as the reference portion 6 can indicate the positions of the display surfaces 421 and 422 and the y-axis direction.

Figure 18:
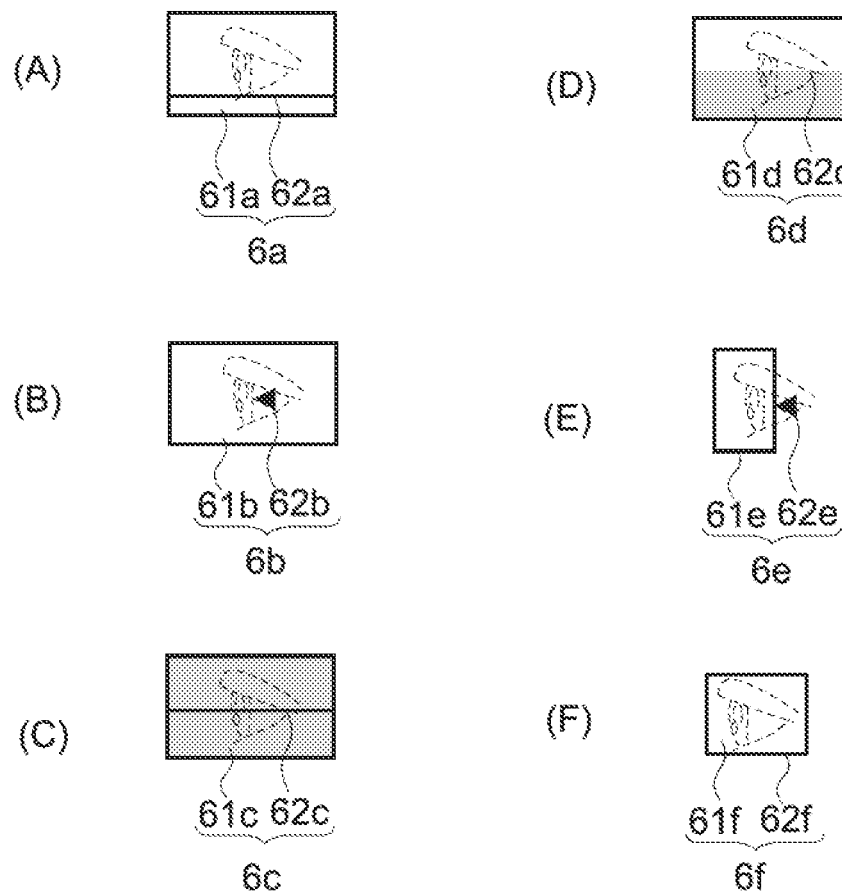
FIG. 18 is a schematic view showing modified examples of a reference portion of the head-mounted display according to the first embodiment of the present technology.

FIG. 18 is a schematic view showing modified examples of the reference portion 6. Picture (A) of FIG. 18 shows a modified example of the mark 62. A mark 62a is formed of a straight line that extends in the y-axis direction at a height position at which the lower edge of the pupil should be located when the display surfaces 421 and 422 and the eyes (pupils) of the wearer are opposed to each other in the y-axis direction. With this, by overlapping the lower edge of the pupil with the mark 62a so that the direction of the line of sight corresponds to an extending direction of the mark 62, the adjustment can be achieved. Further, Picture (B) of FIG. 18 shows an example in which a mark 62b is formed of an arrow head. The mark 62b is configured to indicate the position of the center of the pupil and the y-axis direction.

Further, Picture (C) of FIG. 18 shows an example in which a mark 62c having the same configuration as that of the mark 62 is provided on a semi-see-through window portion 61c. Such a reference portion 6 is capable of allowing the eye of the wearer to be seen from the outside so that the relative position can be adjusted upon the mounting. Meanwhile, upon the image observation, the reference portion 6 is capable of suppressing the amount of incident light from the outside. With this, it is unnecessary to switch between the light-transmitting state and the light-blocking state. Thus, the apparatus configuration can be simplified. Further, Picture (D) of FIG. 18 shows an example in which different degrees of the see-through property are used at a boundary 62d of a window portion 61d, which is formed to be parallel to the y-axis direction at a height position at which the pupil should be located. In this case, the indicator 62 corresponds to the boundary 62d. Also with this, by overlapping the pupil with the boundary 62d so that the direction of the line of sight corresponds to an extending direction of the boundary 62d, the adjustment of the relative position can be achieved. Further, it is also possible to reduce the amount of incident light from the outside.

Picture (E) of FIG. 18 shows an example in which a mark 62e formed of an arrow head as described in Picture (B) of FIG. 18 is provided not on a window portion 61e, but around the window portion 61e. Further, in Picture (F) of FIG. 18, the indicator 62 is a frame 62f of a window portion 61f. In this case, by overlapping the lower edge of the pupil with the frame 62f so that the line of sight corresponds to an extending direction (y-axis direction) of the frame 62f, the adjustment of the relative position can be achieved.

Note that, the modified examples of the reference portion 6 as described above are also applicable to the second and third embodiments.

Although, in all of the above-mentioned embodiments, the reference portion is provided on the left-hand side of the wearer, the present technology is not limited thereto. For example, reference portions may be provided on both of the right- and left-hand sides or a reference portion may be provided only on the right-hand side.

Although, in the first embodiment, the window portion 61 is the liquid crystal shutter, another configuration capable of switching between the light-transmitting state and the light-blocking state may be employed. For example, a physical shutter mechanism capable of opening and closing the window portion 61 may be provided. Further, in the case where the external light incident from the window portion 61 does not cause problems in the image observation, the window portion 61 may be kept in the light-transmitting state.

Although, in the second embodiment, the movable member 450 includes the movable shaft 454 and the movable member 450 moves between the first and second positions by being rotated about the movable shaft 454, the present technology is not limited thereto. For example, the movement between the first and second positions may be a parallel movement in the upper and lower directions. That is, at the second position, the field of view of the wearer can be ensured by the movable member 450 retracting upward or downward from the space S.

Although the switch is exemplified as a trigger for driving the movable member 450 in the second embodiment, for example, the following example may be employed. Specifically, the main body 40 may be provided with a detector capable of acquiring information on the motion of the wearer and the position of the movable member 450 may be changed based on the acquired information. With this, it is possible to change the position of the movable member 450 according to the intention of the wearer without touching the HMD 10.

Specific examples of the detector include an angular velocity sensor or an acceleration sensor capable of detecting the motion of the head of the wearer. As a specific example, the movable member 450 may be set to be movable from the first position to the second position when the wearer moves the head upward by a predetermined angle. In this manner, it is possible to switch between the image display mode and the peripheral-vision-ensuring mode by an intuitive operation.

Alternatively, by using a microphone as the detector, it is also possible to recognize a predetermined voice of the wearer or the like and change the position of the movable member 450. Otherwise, by using an image sensor capable of imaging the eyes of the wearer as the detector, to thereby detect a wink or the line of sight of the wearer, it is also possible to change the position of the movable member 450.

The coupler 7 in the third embodiment is not limited to the one having the above-mentioned configuration. For example, a well-known slide lock mechanism or a strong magnet may be used as long as the casing 41A and the mounting portion 5A are detachable from each other and the positions of the coupled casing 41A and mounting portion 5A can be fixed.

It should be noted that the present technology may also be configured as follows.

(1) A head-mounted display, including a casing; and a reference portion provided on the casing for observing an eye of a wearer of the head-mounted display such that a relative position between the casing and the eye of the wearer is adjustable.

(2) The head mounted display according to (1), wherein the reference portion is a window.

(3) The head mounted display according to (2), wherein the eye is visible through the window.

(4) The head-mounted display according to (1), further comprising a mark on the reference portion.

(5) The head-mounted display according to (4), further including a left display surface and a right display surface, and wherein the mark indicates a height position of centers for the left display surface and the right display surface.

(6) The head-mounted display according to (5), wherein each of the left display surface and the right display surface is rectangular, and the mark indicates a height position of the intersections of the diagonals for each of the left display surface and the right display surface.

(7) The head-mounted display according to (1), wherein the reference portion is operable to switch between a light-transmitting state and a light-blocking state.

(8) The head-mounted display according to 1, further including a movable member movable between a first position and a second position, the first position being a position in which the reference portion is covered, and the second position being a position in which the reference portion is uncovered.

(9) The head-mounted display according to (8), wherein the first position is a position in which an opening portion of the head-mounted display is uncovered such that the wearer can see through the opening portion.

(10) The head-mounted display according to (8), further including a mark on the reference portion.

(11) The head-mounted display according to (8), wherein the movable member is manually driven.

(12) The head-mounted display according to (8), wherein the movable member is motor driven.

(13) A head-mounted display, including a casing; a mounting portion that detachably couples to the casing, the mounting portion including a reference portion for observing an eye of a wearer of the mounting portion; and a coupler for detachably coupling the casing to the mounting portion, wherein a relative position between the coupler and the eye of the wearer of the mounting portion is adjustable by observing the eye through the reference portion.

(14) The head mounted display according to (13), wherein the reference portion is a window.

(15) The head mounted display according to (14), wherein the eye is visible through the window.

(16) The head-mounted display according to (13), wherein when the casing is coupled to the mounting portion a side surface of the casing covers the reference portion so as to block light from entering the reference portion.

(17) The head-mounted display according to (13), further including a mark on the reference portion.

(18) A medical system, including a head-mounted display, wherein the head-mounted display includes a casing; and a reference portion provided on the casing for observing an eye of a wearer of the head-mounted display such that a relative position between the casing and the eye of the wearer is adjustable.

(19) The medical system according to (18), wherein the reference portion is a window.

(20) The medical system according to (19), wherein the eye is visible through the window.

(21) The medical system according to (18), further including a mark on the reference portion.

(22) The medical system according to (21), further including a left display surface and a right display surface, and wherein the mark indicates a height position of centers for the left display surface and the right display surface.

(23) The medical system according to (18), further including a movable member movable between a first position and a second position, the first position being a position in which the reference portion is covered, and the second position being a position in which the reference portion is uncovered.

(24) A medical system, including a head-mounted display, wherein the head mounted display includes a casing; a mounting portion that detachably couples to the casing, the mounting portion including a reference portion for observing an eye of a wearer of the mounting portion; and a coupler for detachably coupling the casing to the mounting portion, wherein a relative position between the coupler and the eye of the wearer of the mounting portion is adjustable by observing the eye through the reference portion.

(25) The medical system according to (24), wherein the reference portion is a window.

(26) The medical system according to (25), wherein the eye is visible through the window.

(27) The medical system according to (24), wherein when the casing is coupled to the mounting portion a side surface of the casing covers the reference portion so as to block light from entering the reference portion.

(28) The medical system according to (24), further including a mark on the reference portion.

It should be understood by those skilled in the art that various modifications, combinations, sub-combinations and alterations may occur depending on design requirements and other factors insofar as they are within the scope of the appended claims or the equivalents thereof.

(29) A head-mounted display, including:
a main body including
a casing,
an image display unit including a display surface configured to be capable of emitting image light in a first axis direction, and
a mounting portion that is provided to the casing to be mountable on a head of a wearer; and
a reference portion that is provided to the main body to display, to an outside, a relative position between the main body and an eye of the wearer.

(30) The head-mounted display according to (29), in which
the reference portion further includes a window portion that is provided to the casing to make the eye of the wearer visible from the outside.

(31) The head-mounted display according to (30), in which
the reference portion further includes an indicator that is provided to the window portion to indicate a position of the display surface and the first axis direction.

(32) The head-mounted display according to (31), in which
the window portion is configured to be capable of switching between a light-transmitting state and a light-blocking state.

(33) The head-mounted display according to (30) or (31), in which
the casing further includes first and second side surfaces that are opposed to each other in a second axis direction orthogonal to the first axis direction, and
the window portion is provided to at least either one of the first and second side surfaces.

(34) The head-mounted display according to (33), in which
the main body further includes a movable member configured to be movable between a first position for closing the window portion and a second position for opening the window portion.

(35) The head-mounted display according to (34), in which
the movable member includes
a first area for opening and closing the window portion, and
a second area for supporting the display surface, and
the display surface is configured to emit the image light in the first axis direction at the first position.

(36) The head-mounted display according to (35), in which
the casing further includes an opening portion that is opposed to the second area at the first position.

(37) The head-mounted display according to (29), in which
the mounting portion further includes a coupler configured to detachably couple the casing and the mounting portion to each other, and
the reference portion is provided to the mounting portion to display, to the outside, a relative position of the eye of the wearer to the coupler.

It should be understood by those skilled in the art that various modifications, combinations, sub-combinations and alterations may occur depending on design requirements and other factors insofar as they are within the scope of the appended claims or the equivalents thereof.

What is claimed is:
1. A head-mounted display, comprising:
a casing including a left side surface and a right side surface; and
a reference portion provided on one or both of the left side surface or the right side surface, each said reference portion configured to be visible therethrough so as to enable a side view of an eye of a wearer of the head-mounted display to be viewed from outside the head-mounted display so as to provide a reference for enabling adjustment of a relative position between the casing and the eye of the wearer; and
wherein the left side surface and the right side surface are respectively configured to substantially cover a left-hand side and a right-hand side of eyes of the wearer, except for the reference portion on the one or both of the left side surface or the right side surface, and to block light from outside on the left-hand side and the right-hand side of the eyes of the wearer when the casing is worn by the wearer.

2. The head mounted display as recited in claim 1, wherein the reference portion is a window.

3. The head-mounted display as recited in claim 1, further comprising a mark on the reference portion.

4. The head-mounted display as recited in claim 3, further comprising:
a left display surface and a right display surface, and
wherein the mark indicates a height position of centers for the left display surface and the right display surface.

5. The head-mounted display as recited in claim 4, wherein each of the left display surface and the right display surface is rectangular, and the mark indicates a height position of the intersections of the diagonals for each of the left display surface and the right display surface.

6. The head-mounted display as recited in claim 1, wherein the reference portion is operable to switch between a light-transmitting state and a light-blocking state.

7. The head-mounted display as recited in claim 1, further comprising a movable member movable between a first position and a second position, the first position being a position in which the reference portion is covered, and the second position being a position in which the reference portion is uncovered so as to be visible therethrough.

8. The head-mounted display as recited in claim 7, further comprising a mark on the reference portion.

9. The head-mounted display as recited in claim 7, wherein the movable member is manually driven.

10. The head-mounted display as recited in claim 7, wherein the movable member is motor driven.

11. A medical system, comprising:
a head-mounted display, wherein the head-mounted display comprises a casing having a left side surface and a right side surface; and a reference portion provided on the casing configured to be visible therethrough so as to enable a side view of an eye of a wearer of the head-mounted display involved in a treatment to be viewed from outside the head-mounted display so as to provide a reference for enabling adjustment of a relative position between the casing and the eye of the wearer by a mounting helper involved in the treatment, the left side surface and the right side surface of the casing being respectively configured to substantially cover a left-hand side and a right-hand side of eyes of the wearer, except for the reference portion, and to block light from outside on the left-hand side and the right-hand side of the eyes of the wearer when the casing is worn by the wearer.

12. The medical system as recited in claim 11, wherein the reference portion is a window.

13. The medical system as recited in claim 11, wherein the head-mounted display is configured to present an affected part.

14. The medical system as recited in claim 13, further comprising an endoscope configured to capture endoscopic images.

15. The medical system as recited in claim 14, wherein the endoscopic images have a parallax such that the wearer involved in the treatment can stereoscopically view the affected part.

16. A head-mounted display, comprising:
a casing including a front portion, a left side portion and a right side portion;
an image display unit having a right display surface and a left display surface to provide images to a wearer of the head-mounted display, the right display surface and the left display surface being arranged on an inside surface of the front portion of the casing; and
a reference portion provided on one or both of the left side portion or the right side portion,
each said reference portion provides an open state and a closed state, in which in the open state a respective reference portion is visible therethrough so as to enable a side view of an eye of the wearer to be observed from outside the head-mounted display so as to provide a reference for enabling adjustment of a relative position between the casing and the eye of the wearer and the in closed state the respective reference portion does not enable the side view of the eye to be observed, and
the front portion, the left side portion and the right side portion are configured to substantially cover both eyes of the wearer and to block light from outside in front of the eyes of the wearer and on a left-hand side and a right-hand side of the eyes of the wearer when the head-mounted display is worn by the wearer and when each said reference portion is in the closed state.

* * * * *